US012348697B1

(12) United States Patent
Berkovich et al.

(10) Patent No.: US 12,348,697 B1
(45) Date of Patent: Jul. 1, 2025

(54) ON-SENSOR DATA GUARDIAN

(71) Applicant: Meta Platforms Technologies, LLC, Menlo Park, CA (US)

(72) Inventors: Andrew Samuel Berkovich, Bellevue, WA (US); Karina Singer, Seattle, WA (US); Lyle David Bainbridge, Redwood City, CA (US); Song Chen, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 488 days.

(21) Appl. No.: 17/929,208

(22) Filed: Sep. 1, 2022

(51) Int. Cl.
*G06K 9/00* (2022.01)
*G06V 10/46* (2022.01)
*G06V 10/70* (2022.01)
*H04N 1/44* (2006.01)

(52) U.S. Cl.
CPC ......... *H04N 1/4486* (2013.01); *G06V 10/462* (2022.01); *G06V 10/70* (2022.01)

(58) Field of Classification Search
CPC ....... H04N 1/4486; H04N 13/332–344; H04N 1/44–4493; G06V 10/462; G06V 10/70; G06V 20/20; G02B 27/01–2027/0198; G06T 19/006; G06F 3/011–015; G06F 21/60–645; B60K 35/23–235; A61B 2090/364–368; A61B 2090/502; A61B 5/6803; A63F 2300/8082; A61M 2205/507
See application file for complete search history.

(56) References Cited

U.S. PATENT DOCUMENTS

| | | | |
|---|---|---|---|
| 6,608,792 B2 | 8/2003 | Pitts | |
| 8,625,788 B2 | 1/2014 | Pendakur et al. | |
| 9,990,777 B2 | 6/2018 | Bradski | |
| 10,890,992 B2 | 1/2021 | Timonen et al. | |
| 2004/0057698 A1* | 3/2004 | Frederick | H04N 5/913 386/253 |
| 2012/0274808 A1* | 11/2012 | Chong | H04N 23/631 348/E9.053 |
| 2014/0192063 A1* | 7/2014 | Kaehler | G09G 5/001 345/502 |
| 2014/0201538 A1* | 7/2014 | O'Hare | G06F 21/602 713/189 |

(Continued)

OTHER PUBLICATIONS

Chou S., et al., "A 16Kb Antifuse One-Time-Programmable Memory in 5nm High-K Metal-Gate Fin-FET CMOS Featuring Bootstrap High Voltage Scheme, Read Endpoint Detection and Pseudo-Differential Sensing," 2021 Symposium on VLSI Circuits Digest of Technical Papers, Jun. 2021, pp. 1-2.

(Continued)

*Primary Examiner* — Atiba O Fitzpatrick
(74) *Attorney, Agent, or Firm* — Freestone IP Law PLLC; Aaron J. Visbeek

(57) ABSTRACT

The present disclosure provides a privacy control circuit including an array of pixel cells having a first output data path and a second output data path, the first output data path including a one-time data protection circuitry, a sensor communication interface communicatively coupled to the first output data path, an on-sensor processor coupled to the second output data path and communicatively attached to the sensor communication interface, and a data register communicatively attached to the sensor communication interface.

20 Claims, 16 Drawing Sheets

(56) References Cited

U.S. PATENT DOCUMENTS

2020/0195875 A1* 6/2020 Berkovich ............ H04N 23/61
2021/0218880 A1* 7/2021 Mizumori ............ H04N 23/661

OTHER PUBLICATIONS

Doorn T.S., et al., "Ultra-Fast Programming of Silicided Polysilicon Fuses Based on New Insights in the Programming Physics," IEEE International Electron Devices Meeting, Dec. 2005, 4 pages.
Fellner J., et al., "A One Time Programming Cell Using More than Two Resistance Levels of a PolyFuse," IEEE 2005 Custom Integrated Circuits Conference, 2005, pp. 263-266.

* cited by examiner

FIG. 7C

ON-SENSOR DATA GUARDIAN

BACKGROUND

Image sensors can transmit highly sensitive data over wired transmission lines. These transmission lines and downstream hardware can be hacked or maliciously attacked in an attempt to steal sensitive image data. While in some instances data can be encrypted, it is not always ideal for configuring or during operation of a device.

SUMMARY

The present disclosure relates to image sensors. More specifically, and without limitation, this disclosure relates to an image sensor having an on-sensor controller for altering the off-sensor transfer of all, or a portion of, a digital image.

In some examples, a privacy control circuit is provided. The privacy control circuit includes an array of pixel cells having a first output data path and a second output data path, the first output data path including a one-time data protection circuitry, a sensor communication interface communicatively coupled to the first output data path, an on-sensor processor coupled to the second output data path and communicatively attached to the sensor communication interface, and a data register communicatively attached to the sensor communication interface.

In some aspects, the privacy control circuit further includes a multiplexer configured for selecting between a raw data input signal over the first output data path and a privacy preserving input signal over the second output data path. The on-sensor processor can be configured to obfuscate sensitive image data through encryption, feature extraction, information extraction, image filtering, or a combination thereof. The feature extraction can include at least one of scale-invariant feature transformation (SIFT), hidden layers, and latent space in machine learning workloads. The information extraction can include at least one of object detection, tracking, and classification. The image filtering can include sparse sensing. The one-time data protection circuitry can include one of a polysilicon fuse, a one-time programmable fuse, a via fuse, high voltage transistors, and polyfuse.

In some aspects, the first output data path can include a plurality of data paths. The one-time data protection circuitry can include a plurality of fuses, each of the fuses coupled to a respective one of the plurality of data paths. The one-time data protection circuitry can be coupled in series with the first output data path. The one-time data protection circuitry can be coupled to an input of one or more logic gates or flops. The activation of the one-time data protection circuitry can disable dataflow over the first output data path while dataflow over the second output data path is uninterrupted, preventing access to unprotected raw image data. The sensor communication interface can write to the data register. The first output data path can be configured to transmit raw image data. The second output data path can be configured to transmit processed image data. Data transmission over the one-time data protection circuitry can be destroyed in response to an application of a voltage great than to disable communication over the first output data path.

In some examples, a method for protecting raw data from being accessed is provided. The method includes initiating a traditional operating mode for configuring a device, accessing raw data from an array of pixel cells provided over a first output data path, completing configuration of the device, and activating a one-time data protection circuitry connected in series with the first output data path, the activation of the one-time data protection circuitry disabling access to the raw data provided over the first output data path.

In some aspects, the one-time data protection circuitry includes one of a polysilicon fuse, a one-time programmable fuse, a via fuse, high voltage transistors, and polyfuse. The method can further include a second output data path including processed image data from the array of pixel cells.

In some examples, an artificial reality system is provided. The system includes an array of pixel cells having a first output data path and a second output data path, the first output data path including a one-time data protection circuitry, a sensor communication interface communicatively attached to the first output data path, an on-sensor compute coupled to the second output data path and communicatively attached to the sensor communication interface, a data register communicatively attached to the sensor communication interface, and a display for outputting an artificial reality content.

BRIEF DESCRIPTION OF THE DRAWINGS

Illustrative embodiments are described with reference to the following figures.

FIGS. 7A, 7B, and 7C illustrate examples of an image processing system and its operations.

Figure 1A:
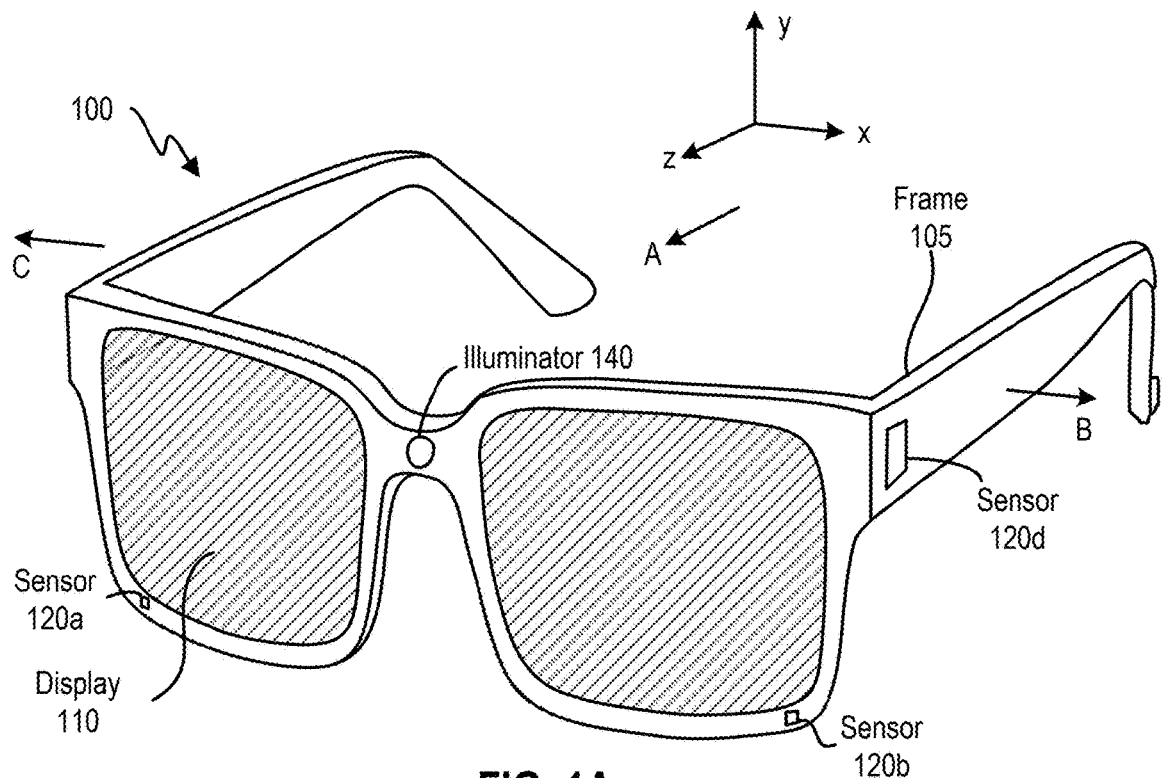
FIGS. 1A, 1B, 1C and 1D are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments.

However, it will be apparent that various embodiments may be practiced without these specific details. The figures and description are not intended to be restrictive.

This disclosure relates to an intelligent sensor implementing a data guardian circuit including on-sensor data protection circuitry that can address at least some of the issues above. It may be desirable for a device to operate sensors in both a "traditional" mode using raw image data readouts from sensors and a "private" mode leveraging privacy preserved data from processors throughout their life cycle. To support both traditional and private sensor modes, sensors are generally designed with switch-controlled bypass mechanisms to dictate whether the raw image data or the privacy preserved data (or processed data) is output. The switch-controlled bypass mechanisms write data into an on-sensor register which then controls the data path for both raw and processed image data. However, switch control mechanisms can be exploited by malicious users if they have access to sensor datasheets and drivers/firmware. Therefore, secure methods for sensor programming are desirable. In some examples the data guardian circuit is a subsystem within the device or sensors for processing, generating, and/or transforming digital image data prior to sending the digital image data to a separate off-sensor system. The data guardian circuit may utilize a processor that implements a number of techniques to detect and remove alterable features from a digital image prior to exporting image data to the off-sensor system. The data guardian circuit also includes the on-sensor data protection circuitry that can destroy access to any data paths that would output raw image data. The sensor data protection circuitry can be or otherwise include a fuse that, when activated, permanently destroys at least part of an output data path that is responsible for outputting raw image data.

The disclosed techniques may include or be implemented in conjunction with an artificial reality device or system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1B:
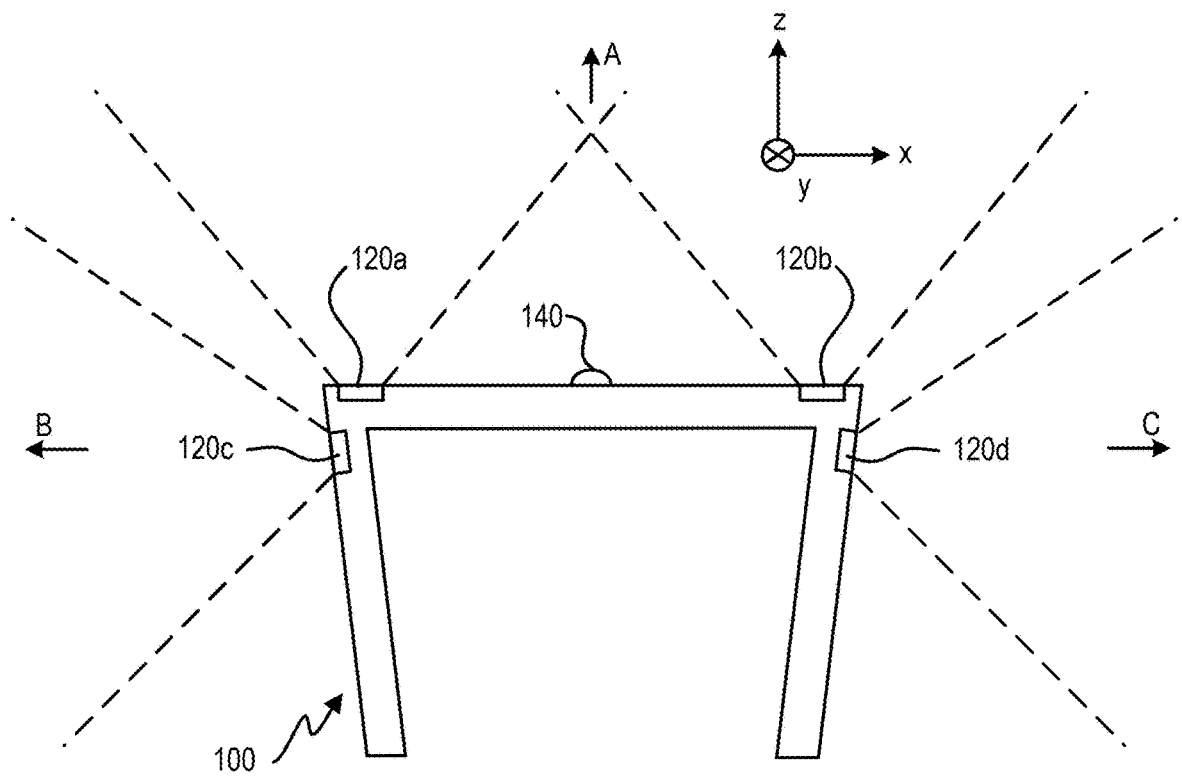

FIGS. 1A and 1B are diagrams of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 includes a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a simultaneous localization and mapping (SLAM) algorithm to track a set of objects in the physical environment and within a view of field of the user as the user moves within the physical environment. The location tracking system can construct and update a map of the physical environment based on the set of objects and track the location of the user within the map. By providing image data corresponding to multiple fields of views, sensors 120a-120d can provide the location tracking system with a more holistic view of the physical environment, which can lead to more objects being included in the construction and updating of the map. With such an arrangement, the accuracy and robustness of tracking a location of the user within the physical environment can be improved.

In some embodiments, near-eye display 100 may further include one or more active illuminators 140 to project light into the physical environment. The light projected can be associated with different frequency spectrums (e.g., visible light, infrared light, ultraviolet light), and can serve various purposes. For example, illuminator 140 may project light in a dark environment (or in an environment with low intensity of infrared light, ultraviolet light, etc.) to assist sensors 120a-120d in capturing images of different objects within the dark environment to, for example, enable location tracking of the user. Illuminator 140 may project certain markers onto the objects within the environment, to assist the location tracking system in identifying the objects for map construction/updating.

In some embodiments, illuminator 140 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 140 may project a set of IR markers on the object, the images of which can be captured by the IR pixel array. Based on a distribution of the IR markers of the object as shown in the image, the system can estimate a distance of different parts of the object from the IR pixel array and generate a stereoscopic image of the object based on the distances. Based on the stereoscopic image of the object, the system can determine, for example, a relative position of the object with respect to the user and can update the image data provided to display 110 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 140 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1C:
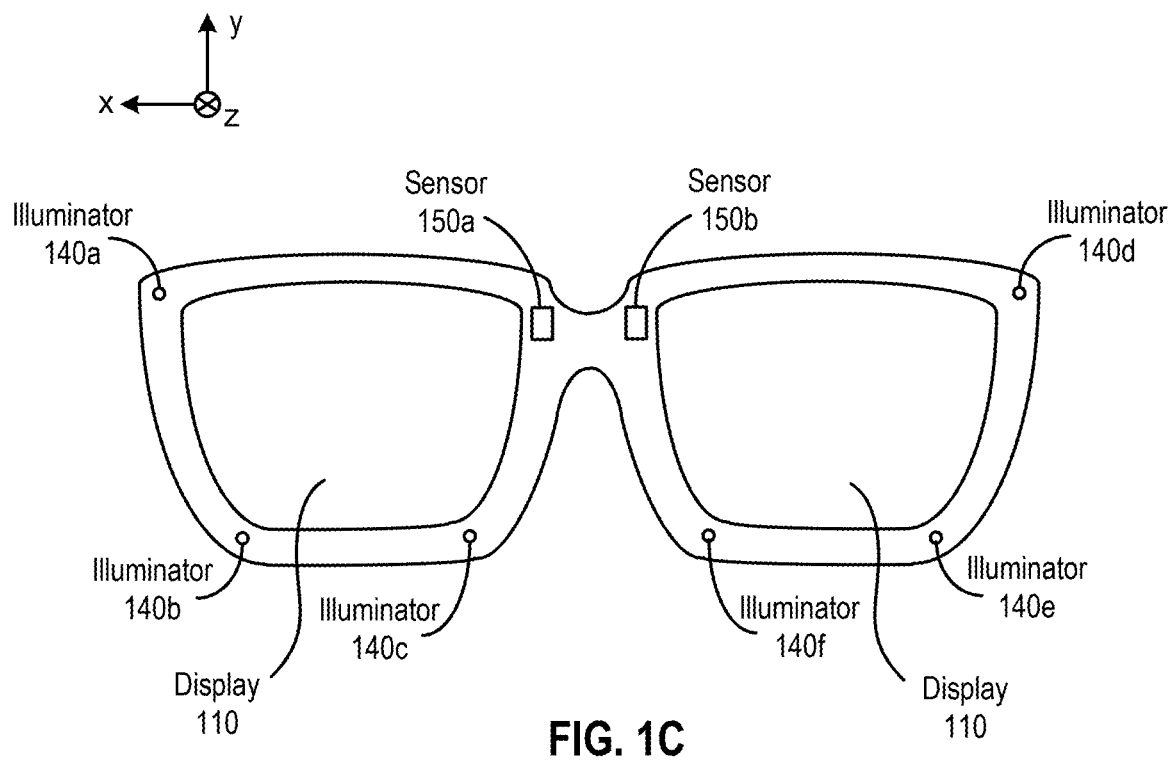
Figure 1D:
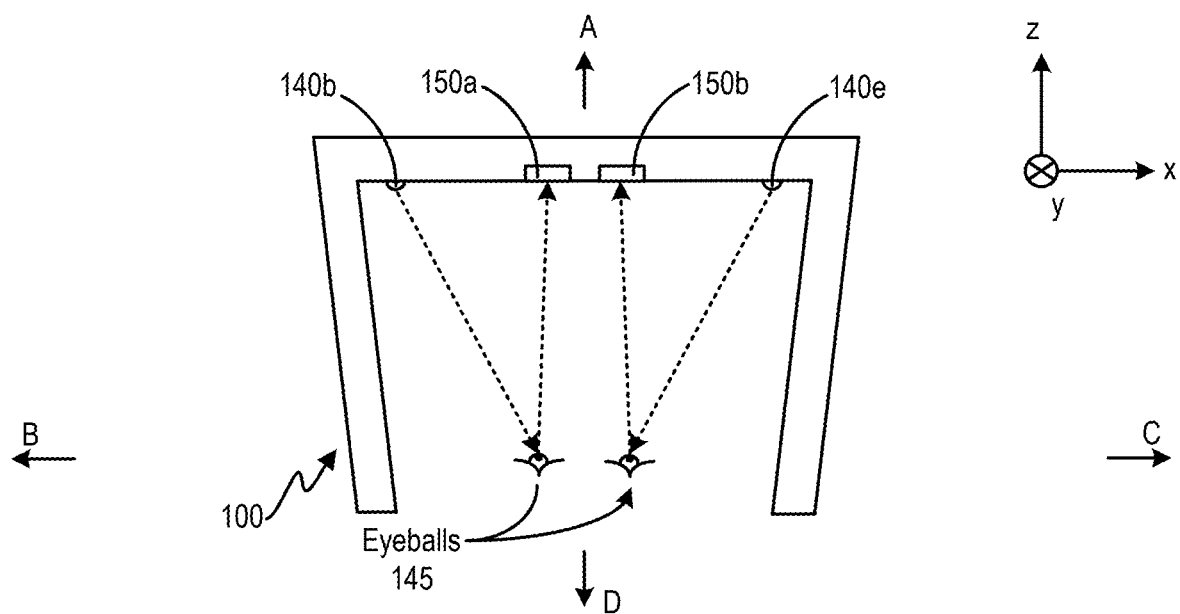

FIGS. 1C and 1D are diagrams of another embodiment of the near-eye display 100. FIGS. 1C and 1D illustrate a side of near-eye display 100 that faces the eyeball(s) 135 of the user who wears near-eye display 100. As shown in FIGS. 1C and 1D, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., near infrared (NIR)) towards direction D (which is opposite to direction A of FIGS. 1A and 1B). The emitted light may be associated with a certain pattern and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user and may be received by sensor 150b. Sensor 150b may also include a pixel array to generate an image of the reflected pattern. Based on the images of the reflected pattern from sensors 150a and 150b, the system can determine a gaze point of the user and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b include the same sensor devices as image sensors 120a-120d of FIGS. 1A and 1B, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate in an environment with low light intensity.

Figure 2:
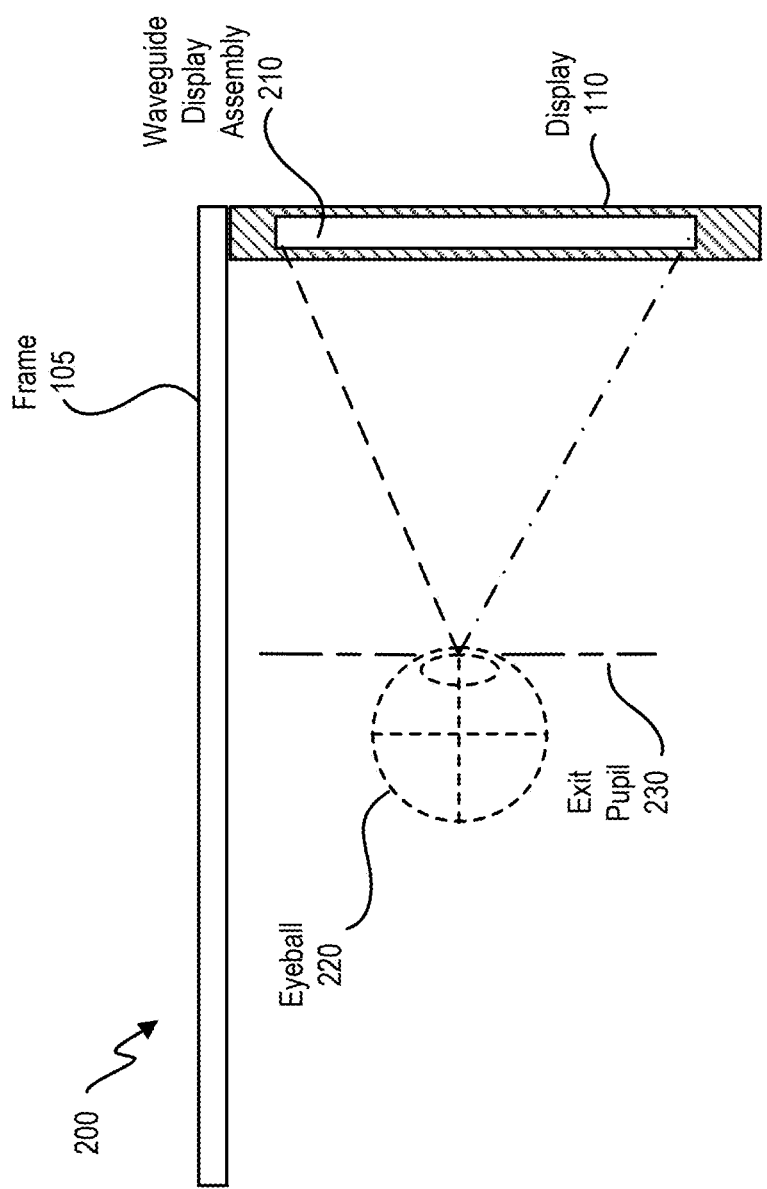
FIG. 2 is an embodiment of a cross sectional side view of the near-eye display.

FIG. 2 is an embodiment of a cross section 200 of the near-eye display 100 illustrated in FIGS. 1A-1D. Display 110 includes at least one waveguide display assembly 210. An exit pupil 230 is a location where a single eyeball 220 of the user is positioned in an eye box region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eye box located at exit pupil 230 and to eyeball 220. Waveguide display assembly 210 may be composed of one or more materials (e.g., plastic, glass, etc.) with one or more refractive indices. In some embodiments, the near-eye display 100 includes one or more optical elements between waveguide display assembly 210 and eyeball 220.

In some embodiments, waveguide display assembly 210 includes a stack of one or more waveguide displays including, but not limited to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
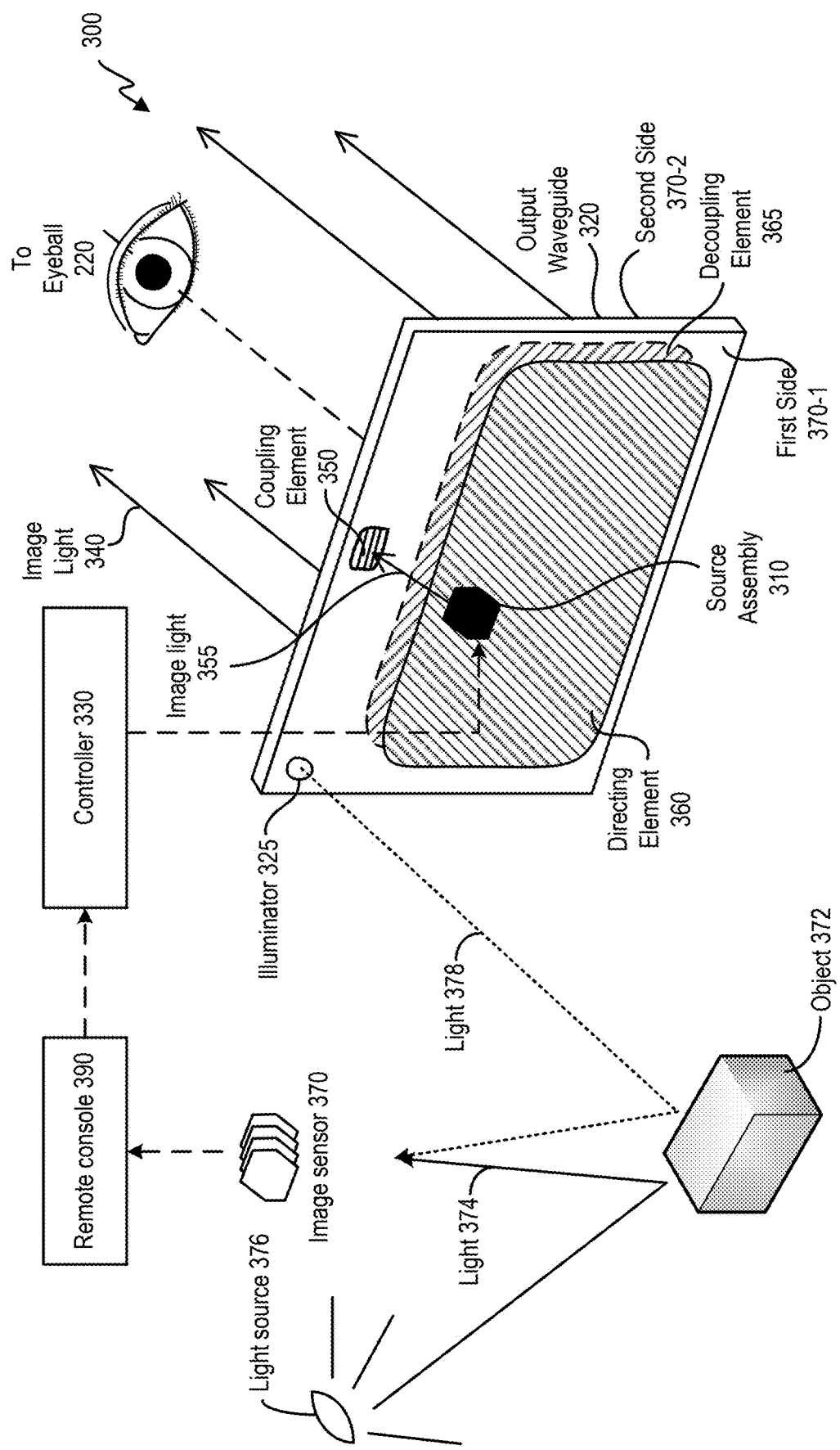
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display that is separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, for example, a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, for example, a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, for example, silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eye box with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIGS. 1A and 1B to generate image data of a physical environment in front of the user (e.g., for location determination). Image sensor 150a and 150b may also be located on second side 370-2 and may include image sensors 150a and 150b of FIGS. 1C and 1D to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user or a gaze point of the user and determine the content of the images to be displayed to the user. The remote console can transmit instructions to controller 330 related to the determined content. Based on the instructions, controller 330 can control the generation and outputting of image light 355 by source assembly 310.

Figure 4:
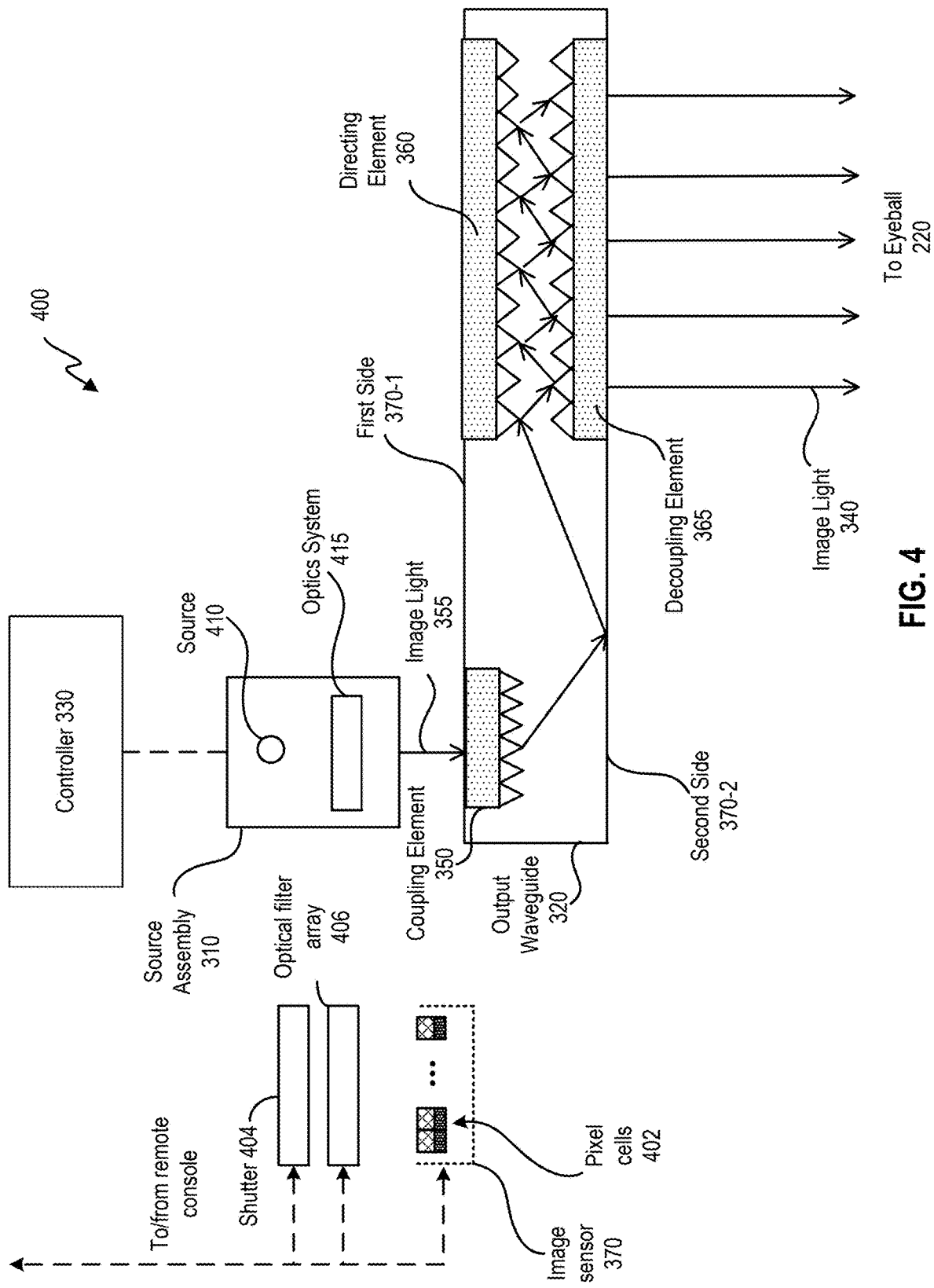
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter switch, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402 and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, for example, a laser diode, a vertical cavity surface emitting laser, and/or a light emitting diode.

Optics system 415 includes one or more optical components that condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
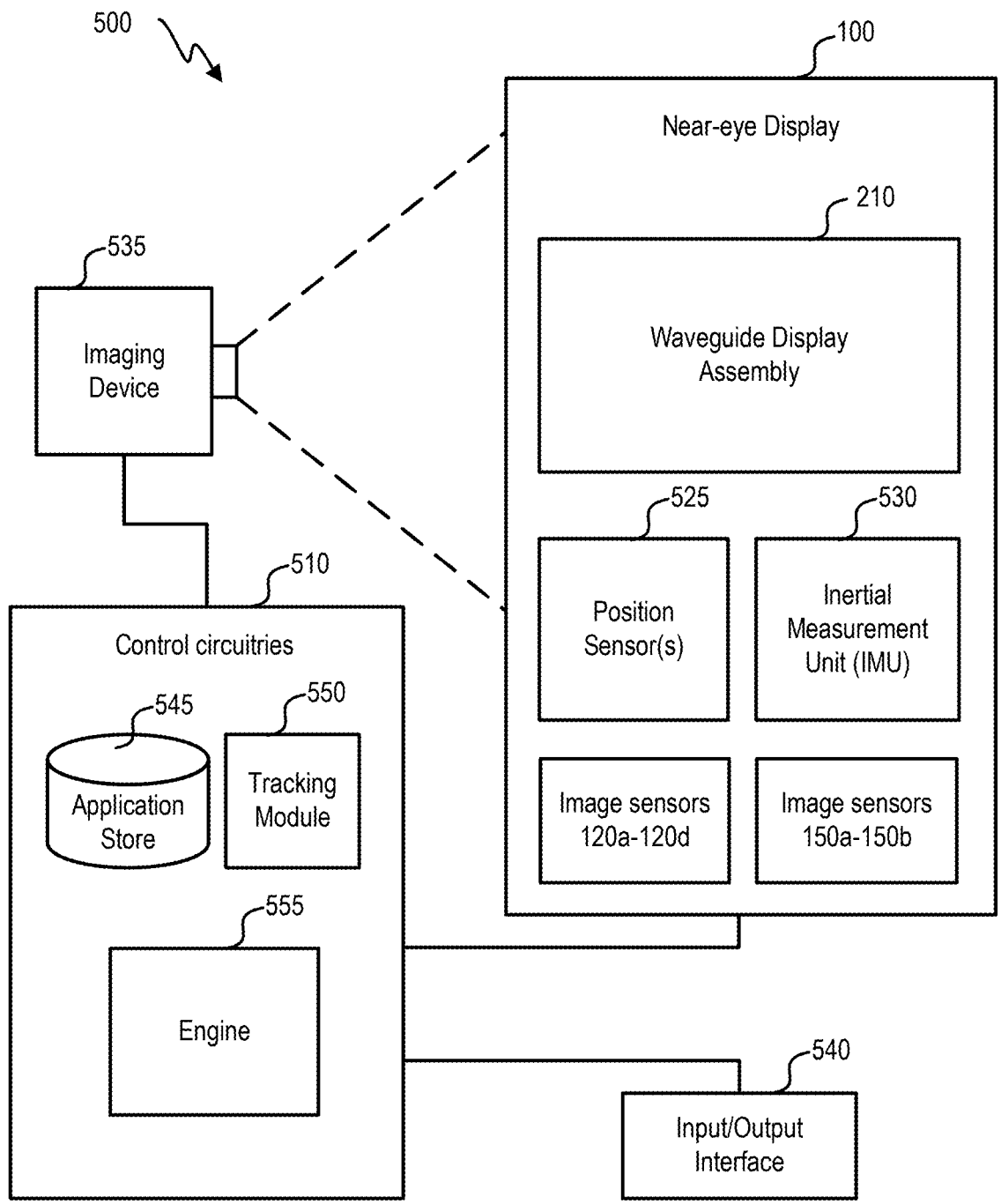
FIG. 5 is a block diagram of an embodiment of a system including the near-eye display.

FIG. 5 is a block diagram of an embodiment of a system 500 including the near-eye display 100. The system 500 includes near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIGS. 1A and 1B for generating image data of a physical environment in which the user is located, for performing location tracking of the user. Imaging device 535 may further include, for example, image sensors 150a-150b of FIGS. 1C and 1D for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
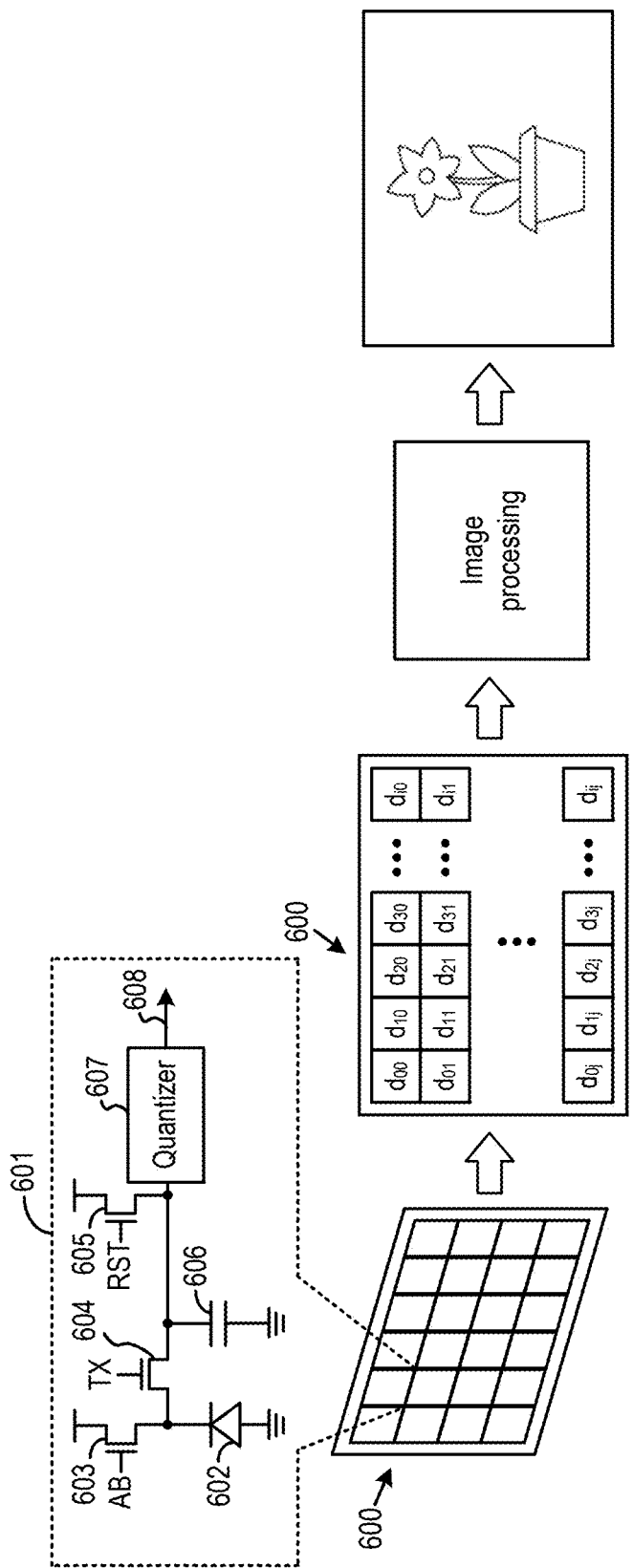
FIG. 6 illustrates an example of an image sensor and its operations.

FIG. 6 illustrates an example of an image sensor 600 and its operations. As shown in FIG. 6, image sensor 600 can include an array of pixel cells, including pixel cell 601, and can generate digital intensity data corresponding to pixels of an image. Pixel cell 601 may be part of pixel cells 402 of FIG. 4. As shown in FIG. 6, pixel cell 601 may include one or more photodiodes 602, an electronic shutter switch 603, a transfer switch 604, a reset switch 605, a charge storage device 606, and a quantizer 607. Quantizer 607 can be a pixel-level ADC that is accessible only by pixel cell 601. Photodiode 602 may include, for example, a P-N diode, a P-I-N diode, or a pinned diode, whereas charge storage device 606 can be a floating diffusion node of transfer switch 604. Photodiode 602 can generate and accumulate charge upon receiving light within an exposure period, and the quantity of charge generated within the exposure period can be proportional to the intensity of the light.

Figure 7A:
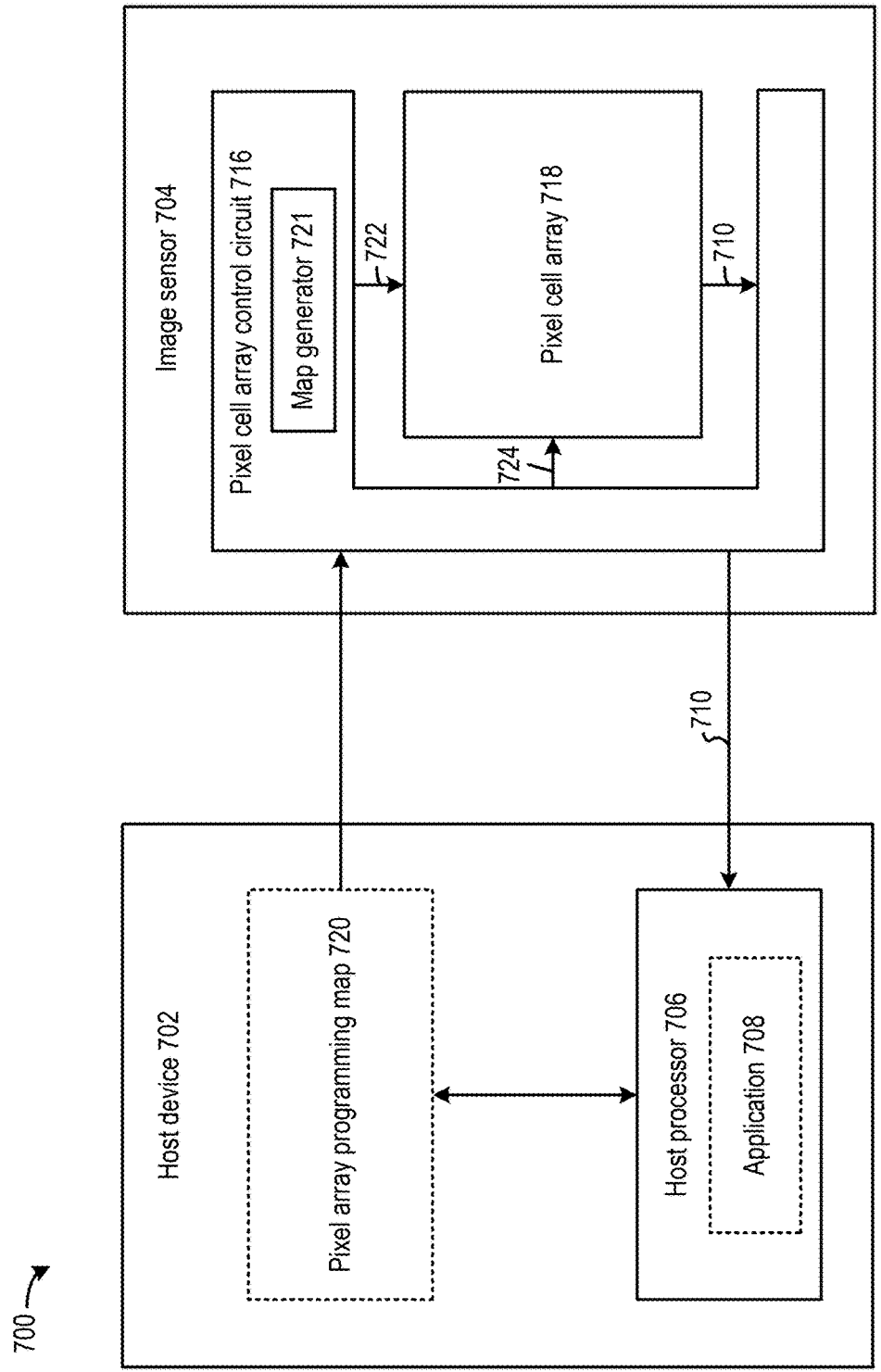
Figure 7B:
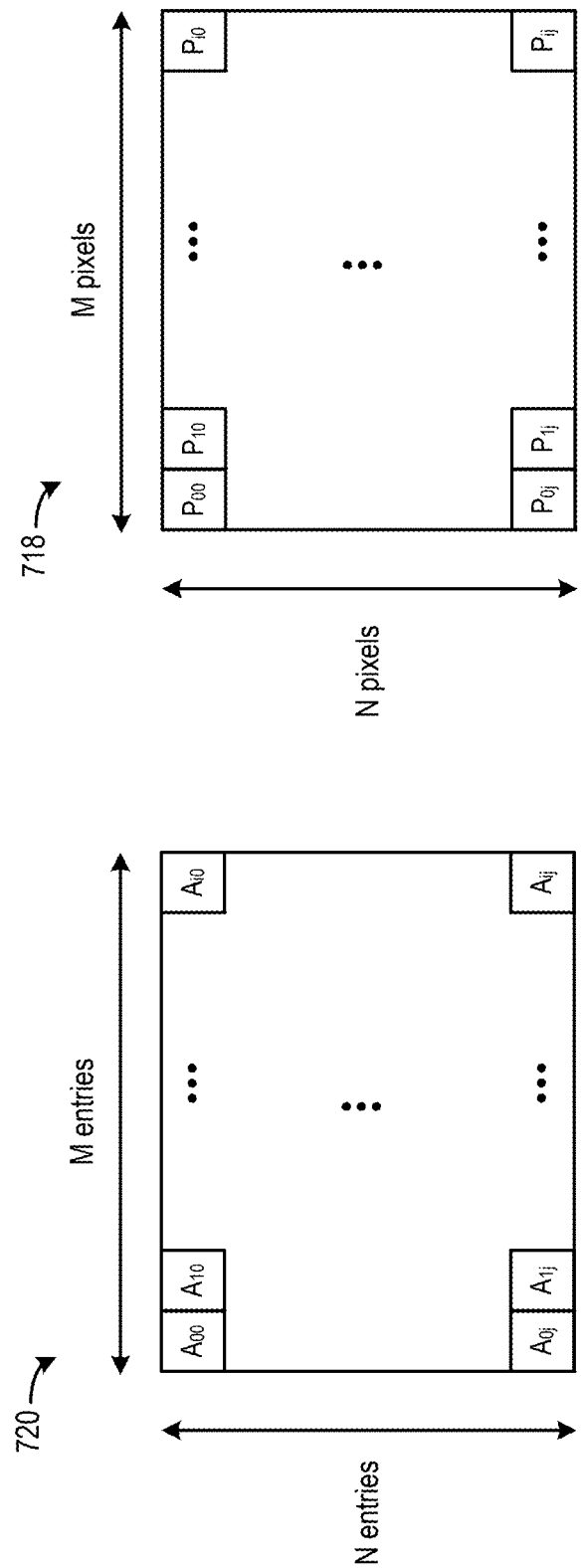
Figure 7C:
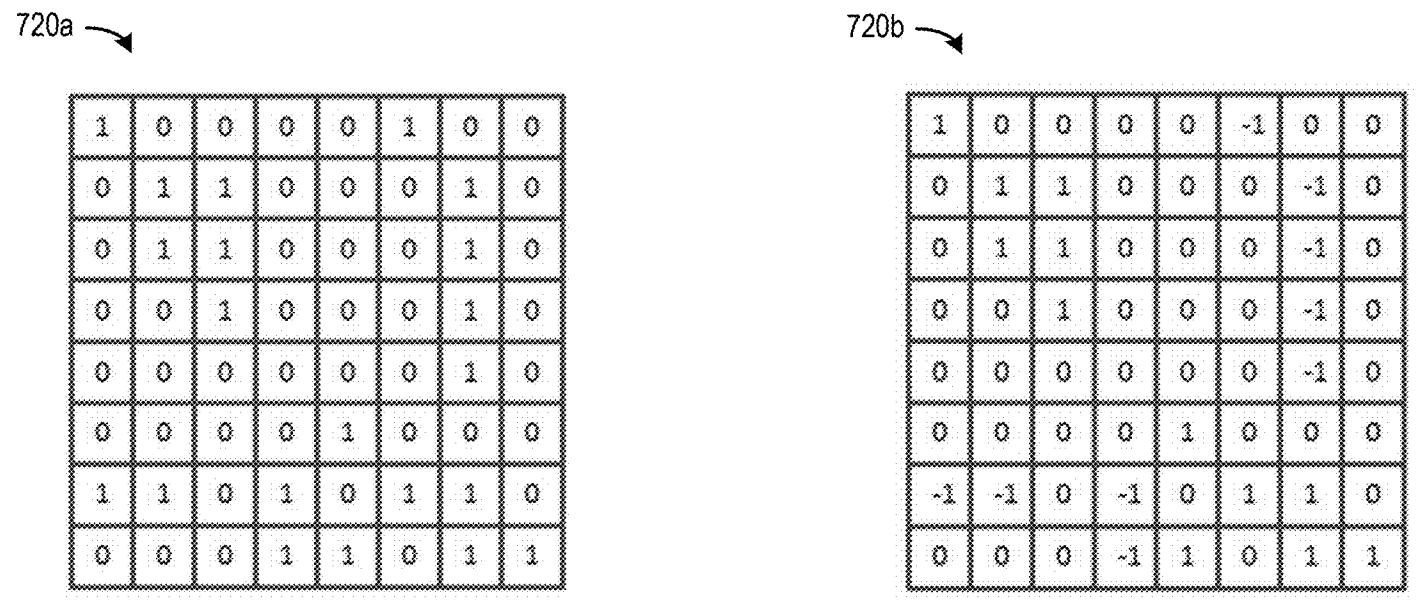

FIGS. 7A, 7B, and 7C illustrate examples of an image processing system 700 and its operations. Image processing system 700 includes a host device 702 and an image sensor 704. Host device 702 can include a host processor 706 which operates an application 708 which can perform operations including, for example, fusion of two-dimensional (2D) and three-dimensional (3D) sensing, object recognition and tracking, or location tracking, on an image 710 generated by image sensor 704. In some examples, image processing system 700 can be in a wearable device. In some examples, processing system 700 can be split into multiple separate devices. For example, host device 702 can be a personal computer (PC), a smart phone, a camera base station, or an integrated circuit such as a central processing unit (CPU), a field-programmable switch array (FPGA), or a micro controller unit (MCU). Host device 702 and image sensor 704 can be electrically connected via an interconnect (not shown in FIG. 7A), such as an interconnect compatible with the Mobile Industry Processor Interface (MIPI) standard.

Referring to FIG. 7A, image sensor 704 includes a pixel cell array control circuit 716 and a pixel cell array 718. Each pixel cell of pixel cell array 718 can include similar components as pixel cell 601 of FIG. 6 such as photodiode 602, electronic shutter switch 603, and transfer switch 604, to perform a light measurement operation to generate pixel data. In some examples, pixel cell array 718 and pixel cell array control circuit 716 can form a stack structure to maximize the light receiving surface of image sensor 704, which allows pixel cell array 718 to include more pixel cells to improve resolution.

Each pixel cell in pixel cell array 718 may include a configuration memory, which can be part of or external to the pixel cell, to store programming data for configuring/programming the light measurement operation at each pixel cell, or at blocks of pixel cells. The configuration memory of each pixel cell can be individually addressable, which allows the light measurement operation at each pixel cell, or a block of pixel cells, to be individually programmed by pixel cell array control circuit 716 based on a pixel array programming map 720. In some examples, pixel array programming map 720 can be generated by host processor 706 as a result of the object tracking operation on image 710. In some examples, pixel cell array control circuit 716 may also include a programming map generator 721 to generate pixel array programming map 720 based on the image 710. Pixel cell array control circuit 716 can extract programming data from pixel array programming map 720 and transmit the programming data in the form of control signals 722 and 724 to pixel cell array 718. Programming data can be read out from the configuration memory to configure the light measurement operation.

As to be described in greater detail below, the configuration of the light measurement operation at a pixel cell can include, for example, setting a power state of the different circuit components accessed/associated by the pixel cell, such as quantization circuit 620. The configuration may also include other aspects of the light measurement operation, such as setting an exposure period for the light measurement operation or setting the quantization resolution/bit depth.

Pixel array programming map 720 can include programming data targeted at each pixel cell of the array of pixel cells. FIG. 7B illustrates an example of pixel array programming map 720. As shown in FIG. 7B, pixel array programming map 720 can be include a 2D array of programming data, with each entry of programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The programming data $A_{00}$ at entry (0, 0) of pixel array programming map 720 is targeted at pixel cell $P_{00}$ at pixel location (0, 0) of pixel cell array 718, whereas the programming data $A_{01}$ at entry (0, 1) of pixel array programming map 720 is targeted at pixel cell $P_{01}$ at pixel location (0, 1) of pixel cell array 718. In some examples, the programming data of each entry of pixel array programming map 720 can be transmitted sequentially following a pre-determined scanning pattern, such as traversing a row from left to right (e.g., $A_{00}, A_{01}, \ldots A_{0i}$), followed by the next row from left to right (e.g., $A_{10}, A_{11}, \ldots A_{1i}$), to form a stream of serial data. The programming data for each entry can be extracted and identified from the stream of serial data based on the scanning pattern and the order by which the entries are received. In some examples, pixel array programming map 720 can be sent only when certain programming data need to be updated between frames, and only the programming data that need to be updated are included in pixel array programming map 720. In some examples, each entry of pixel array programming map 720 can also target at a block of pixel cells (e.g., a 2×2 array of pixel cells, a 4×4 array of pixel cells).

Depending on the configuration operation, each entry of pixel array programming map 720 can either include binary programming data or non-binary programming data. FIG. 7C illustrates examples of pixel array programming maps 720a and 720b. As shown in FIG. 7C, pixel array programming map 720a includes binary programming data 0 and 1. In some examples, the binary programming data at each entry of pixel array programming map 720a can enable (e.g., with programming data set to 1) or disable (e.g., with programming data set to 0) the generation of pixel data at the pixel cell corresponding to the entry. The binary programming data can also set a power state of the quantization circuit 620 used by the pixel cell. For example, if the programming data indicates that the pixel cell is not to generate pixel data, the processing circuits and memory included in the quantization circuit used by the pixel cell can be powered down.

In addition, pixel array programming map 720b may include non-binary programming data such as −1, 0, 1, or other values. The non-binary programming data of pixel array programming map 720b, as shown in FIG. 7C, can be used to, for example, set an exposure period or set a quantization resolution. For example, a programming value of −1 can indicate the pixel cell and the quantization circuit being disabled during a frame period, a programming value of 0 can indicate the pixel cell and the quantization circuit operating in a low-resolution mode, whereas a programming value 1 can indicate the pixel cell and the quantization circuit operating in the full resolution mode. The pixel cell can then set the power state of the processing circuits and the memory of the quantization circuit accordingly.

Figure 8A:
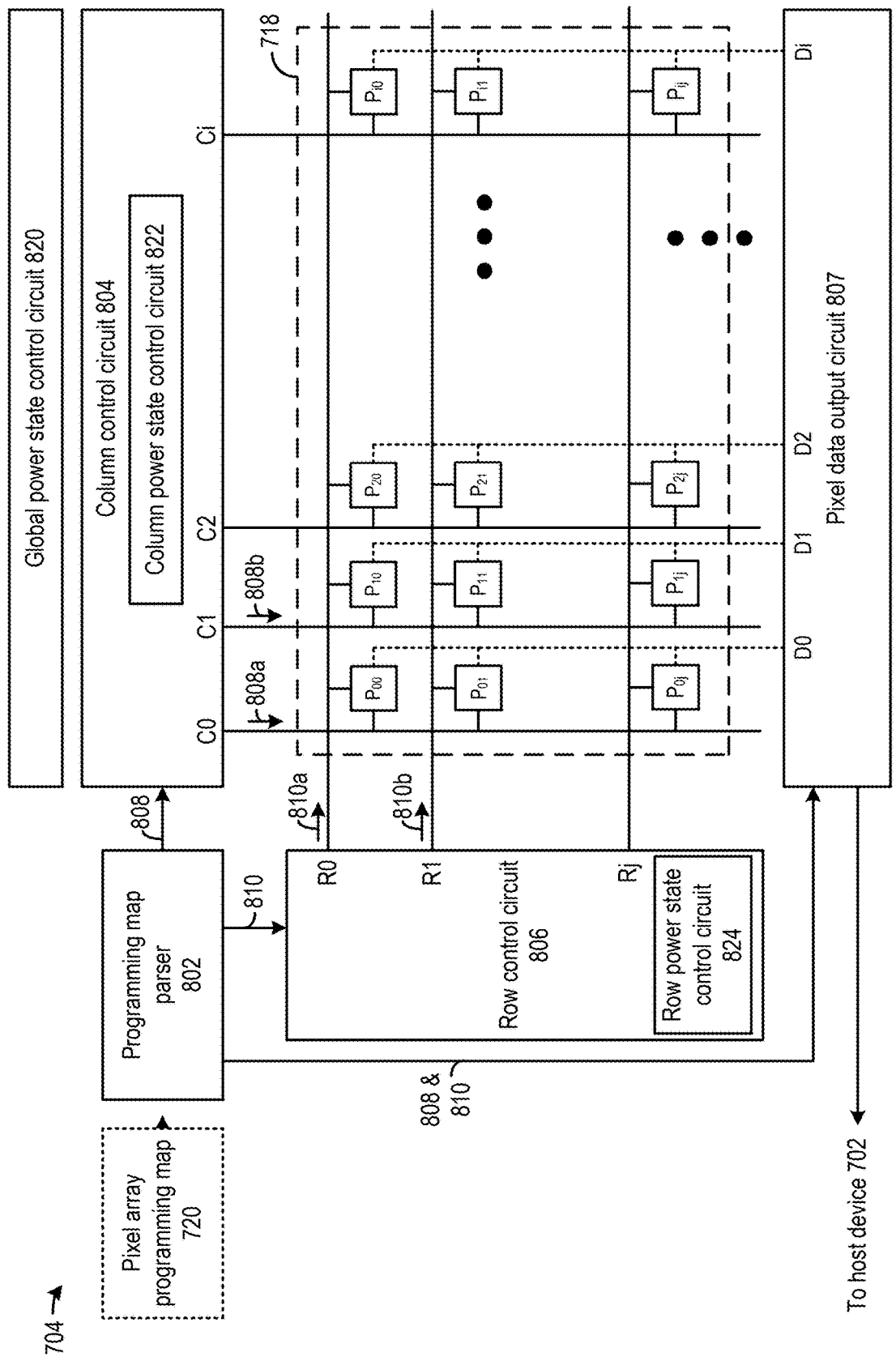
FIGS. 8A, 8B, and 8C illustrate examples components of the image processing system of FIGS. 7A-7C.
Figure 8B:
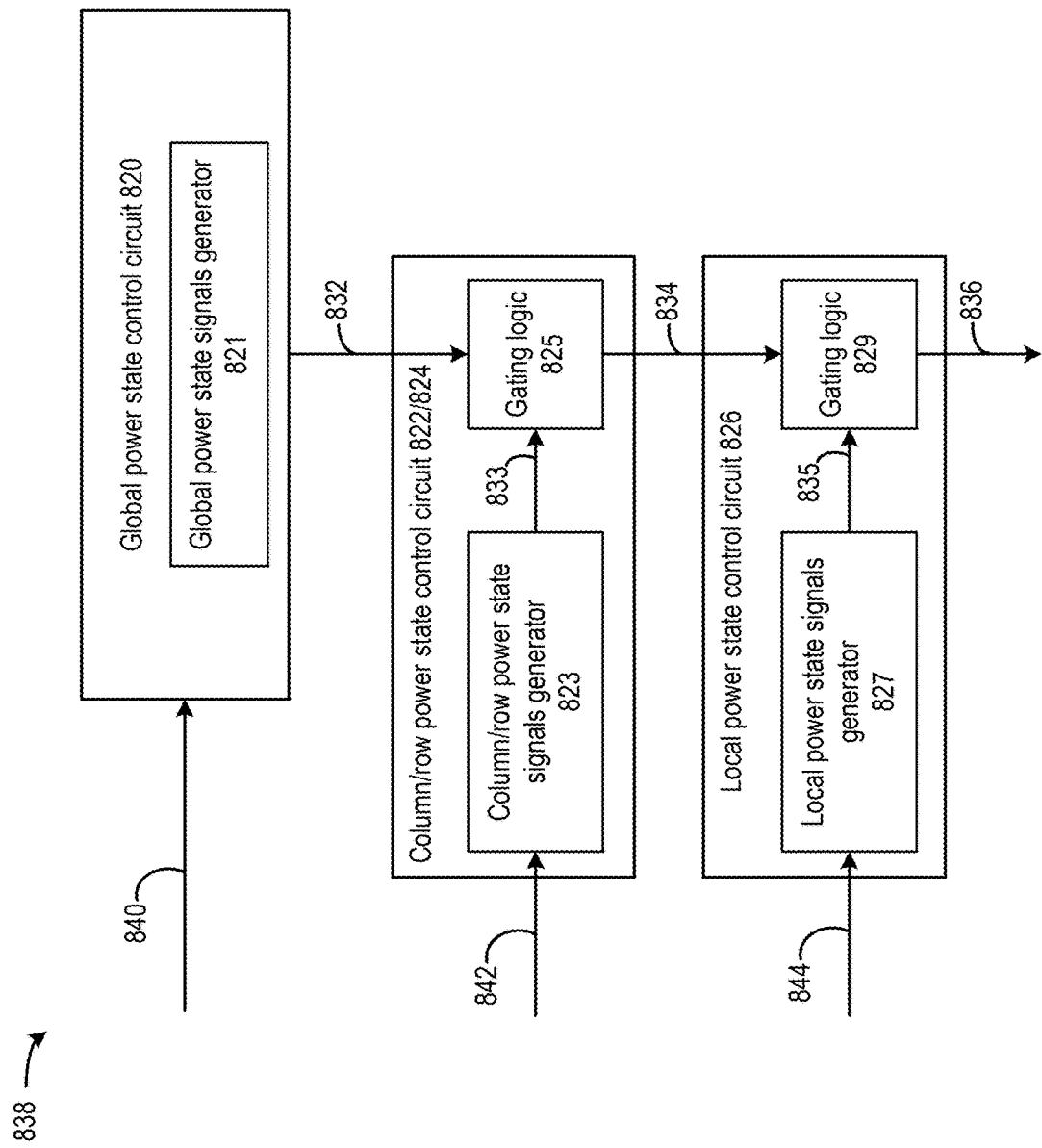
Figure 8C:
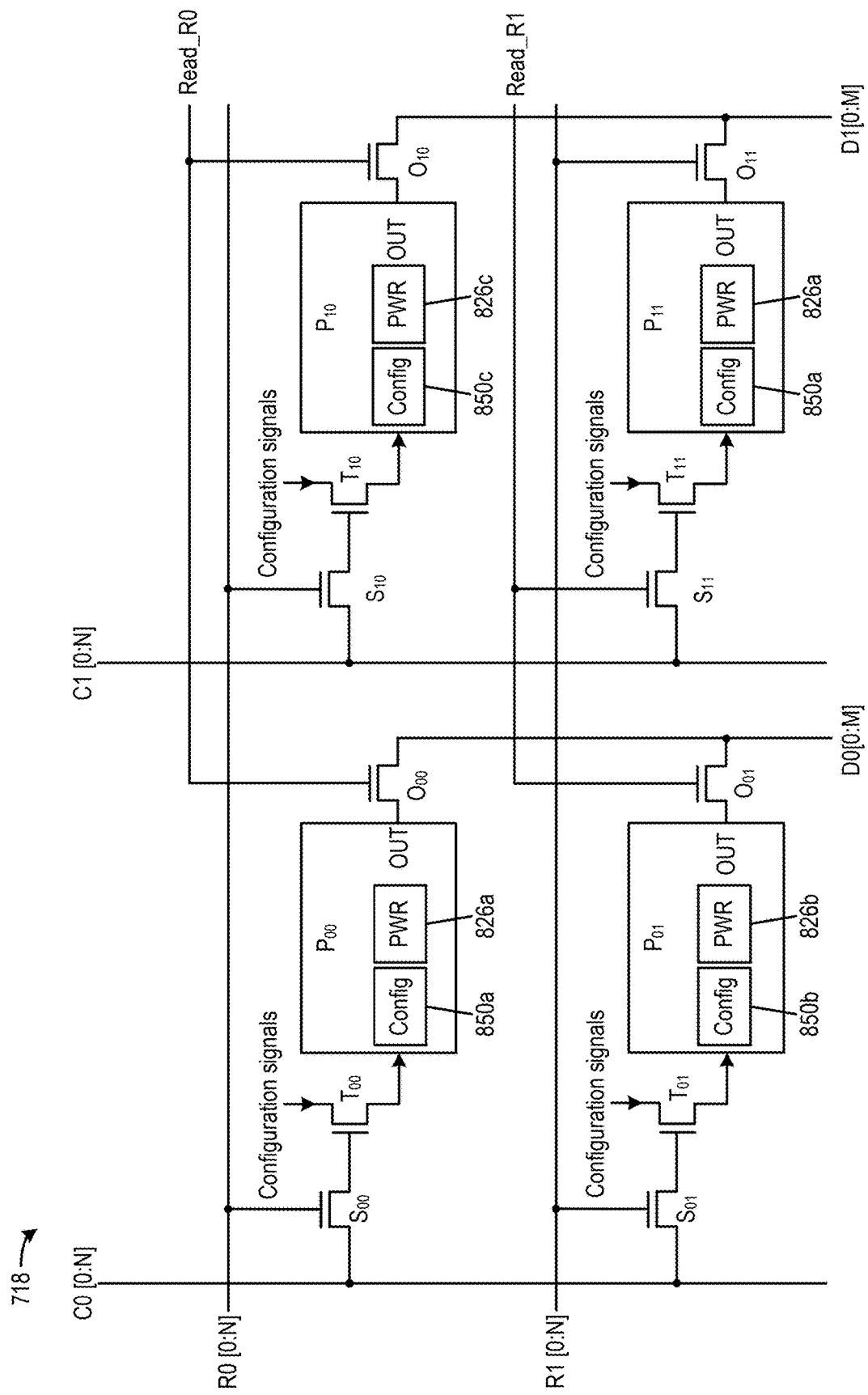

FIGS. 8A, 8B, and 8C illustrate example components of pixel cell array control circuit 716 and pixel cell array 718 of image sensor 704. As shown in FIG. 8A, pixel cell array control circuit 716 can include a programming map parser 802, a column control circuit 804, a row control circuit 806, and a pixel data output circuit 807. Programming map parser 802 can parse pixel array programming map 720, which can be in a serial data stream, to identify the programming data for each pixel cell (or block of pixel cells). The identification of the programming data can be based on, for example, a pre-determined scanning pattern by which the two-dimensional pixel array programming map is converted into the serial format, as well as the order by which the programming data is received by programming map parser 802 from the serial data stream. Programming map parser 802 can create a mapping among the row addresses of the pixel cells, the column addresses of the pixel cells, and one or more configuration signals based on the programming data targeted at the pixel cells. Based on the mapping, programming map parser 802 can transmit control signals 808 including the column addresses and the configuration signals to column control circuit 804, as well as control signals 810 including the row addresses mapped to the column addresses and the configuration signals to row control circuit 806. In some examples, the configuration signals can also be split between control signals 808 and control signals 810 or sent as part of control signals 810 to row control circuit 806.

Column control circuit 804 and row control circuit 806 are configured to forward the configuration signals received from programming map parser 802 to the configuration memory of each pixel cell of pixel cell array 718. In FIG. 8A, each box labelled $P_{ij}$ (e.g., $P_{00}$, $P_{01}$, $P_{10}$, $P_{11}$) can represent a pixel cell or a block of pixel cells (e.g., a 2×2 array of pixel cells, a 4×4 array of pixel cells) and can include or can be associated with a quantization circuit. As shown in FIG. 8A, column control circuit 804 drives a plurality of sets of column buses C0, C1, . . . . Ci. Each set of column buses includes one or more buses and can be used to transmit control signals 722 of FIG. 7A, which can include a column selection signal and/or other configuration signals, to a column of pixel cells. For example, column bus(es) C0 can transmit a column selection signal 808a to select a column of pixel cells (or a column of blocks of pixel cells) $p_{00}, p_{01}, \ldots p_{0j}$, column bus(es) C1 can transmit a column selection signal 808b to select a column of pixel cells (or blocks of pixel cells) $p_{10}, p_{11}, \ldots p_{1j}$, etc.

Further, row control circuit 806 drives a plurality of sets of row buses labelled R0, R1, . . . . Rj. Each set of row buses also includes one or more buses and can be used to transmit control signals 724 of FIG. 7A, which can include a row selection signal and/or other configuration signals, to a row of pixel cells, or a row of blocks of pixel cells. For example, row bus(es) R0 can transmit a row selection signal 810a to select a row of pixel cells (or blocks of pixel cells) $p_{00}$, $p_{10}, \ldots p_{i0}$, row bus(es) R1 can transmit a row selection signal 810b to select a row of pixel cells (or blocks of pixel cells) $p_{01}, p_{11}, \ldots p_{1i}$, etc. Any pixel cell (or block of pixel cells) within pixel cell array 718 can be selected based on a combination of the row selection signal and the column signal to receive the configuration signals. The row selection signals, column selection signals, and the configuration signals (if any) are synchronized based on control signals 808 and 810 from programming map parser 802, as described above. Each column of pixel cells can share a set of output buses to transmit pixel data to pixel data output module 807. For example, column of pixel cells (or blocks of pixel cells) $p_{00}, p_{01}, \ldots p_{0j}$ can share output buses $D_0$, column of pixel cells (or blocks of pixel cells) $p_{10}, p_{11}, \ldots p_{1j}$ can share output buses $D_1$, etc.

Pixel data output module 807 can receive the pixel data from the buses, convert the pixel data into one or more serial data streams (e.g., using a shift register), and transmit the data streams to host device 702 under a pre-determined protocol such as MIPI. The data stream can come from a quantization circuit associated with each pixel cell (or block of pixel cells) as part of a sparse image frame. In addition, pixel data output module 807 can also receive control signals 808 and 810 from programming map parser 802 to determine, for example, which pixel cell does not output pixel data or the bit width of pixel data output by each pixel cell, and then adjust the generation of serial data streams accordingly. For example, pixel data output module 807 can control the shift register to skip a number of bits in generating the serial data streams to account for, for example, variable bit widths of output pixel data among the pixel cells or the disabling of pixel data output at certain pixel cells.

In addition, pixel cell array control circuit 716 further includes a global power state control circuit 820, a column power state control circuit 822, a row power state control circuit 824, and a local power state control circuit 826 at each pixel cell or each block of pixel cells (not shown in FIG. 8A) forming hierarchical power state control circuits. Global power state control circuit 820 can be of the highest level in the hierarchy, followed by row/column power state control circuit 822/824, with local power state control circuit 826 at the lowest level in the hierarchy.

The hierarchical power state control circuits can provide different granularities in controlling the power state of image sensor 704. For example, global power state control circuit 820 can control a global power state of all circuits of image sensor 704, including processing circuits and memory of all pixel cells, DAC, counter, etc. Row power state control circuit 822 can control the power state of processing circuits and memory of each row of pixel cells (or blocks of pixel cells) separately, whereas column power state control circuit 824 can control the power state of processing circuits and memory of each column of pixel cells (or blocks of pixel cells) separately. Some examples may include row power state control circuit 822 but not column power state control circuit 824, or vice versa. In addition, local power state control circuit 826 can be part of a pixel cell or a block of pixel cells and can control the power state of processing circuits and memory of the pixel cell or the block of pixel cells.

FIG. 8B illustrates examples of internal components of hierarchical power state control circuits and their operations. Specifically, global power state control circuit 820 can output a global power state signal 832, which can be in the form of a bias voltage, a bias current, a supply voltage, or programming data, which sets a global power state of image sensor 704. Moreover, column power state control circuit 822 (or row power state control circuit 824) can output a column/row power state signal 834 that sets a power state of a column/row of pixel cells (or blocks of pixel cells) of image sensor 704. Column/row power state signal 834 can be transmitted as row signals 810 and column signals 808 to the pixel cells. Further, local power state control circuit 826 can output a local power state signal 836 that sets a power state of the pixel cell (or a block of pixel cells), including the associated processing circuits and memory. Local power state signal 836 can be output to processing circuits and memory of the pixel cells to control their power state.

In hierarchical power state control circuits 838, an upper-level power state signal can set an upper bound for a lower-level power state signal. For example, global power state signal 832 can be an upper-level power state signal for column/row power state signal 834 and set an upper bound for column/row power state signal 834. Moreover, column/row power state signal 834 can be an upper-level power state signal for local power state signal 836 and set an upper bound for local power state signal 836. For example, if global power state signal 832 indicates a low power state, column/row power state signal 834 and local power state signal 836 may also indicate a low power state.

Each of global power state control circuit 820, column/row power state control circuit 822/824, and local power state control circuit 826 can include a power state signal generator, whereas column/row power state control circuit 822/824, and local power state control circuit 826 can include a gating logic to enforce the upper bound imposed by an upper-level power state signal. Specifically, global power state control circuit 820 can include a global power state signals generator 821 to generate global power state signal 832. Global power state signals generator 821 can generate global power state signal 832 based on, for example, an external configuration signal 840 (e.g., from host device 702) or a pre-determined temporal sequences of global power states.

In addition, column/row power state control circuit 822/824 can include a column/row power state signals generator 823 and a gating logic 825. Column/row power state signals generator 823 can generate an intermediate a column/row power state signal 833 based on, for example, an external configuration signal 842 (e.g., from host device 702) or a predetermined temporal sequences of row/column power states. Gating logic 825 can select one of global power state signal 832 or intermediate column/row power state signal 833 representing the lower power state as column/row power state signal 834.

Further, local power state control circuit 826 can include a local power state signals generator 827 and a gating logic 829. Low power state signals generator 827 an intermediate local power state signal 835 based on, for example, an external configuration signal 844, which can be from a pixel array programming map, a pre-determined temporal sequences of row/column power states, etc. Gating logic 829 can select one of intermediate local power state signal 835 or column/row power state signal 834 representing the lower power state as local power state signal 836.

FIG. 8C illustrates additional details of pixel cell array 718, including local power state control circuit 826 (e.g., 826a, 826b, 826c, and 826d, labelled as "PWR" in FIG. 8C) and configuration memory 850 (e.g., 850a, 850b, 850c, and 850d, labelled as "Config" in FIG. 8C) of each pixel cell (or each block of pixel cells). Configuration memory 850 can store first programming data to control a light measurement operation (e.g., exposure period duration, quantization resolution, etc.) of a pixel cell (or a block of pixel cells). In addition, configuration memory 850 can also store second programming data that can be used by local power state control circuit 826 to set the power states of processing circuits and memory. Configuration memory 850 can be implemented as a static random-access memory (SRAM). Although FIG. 8C shows that local power state control circuit 826 and configuration memory 850 are internal to each pixel cell, it is understood that configuration memory 850 can also be external to each pixel cell, such as when local power state control circuit 826 and configuration memory 850 are for a block of pixel cells.

As shown in FIG. 8C, the configuration memory 850 of each pixel cell is coupled with column buses C and row buses R via transistors S, such as $S_{00}$, $S_{10}$, $S_{10}$, $S_{11}$, etc. In some examples, each set of column buses (e.g., C0 or C1) and row buses (e.g., R0 or R1) can include multiple bits. For example, in FIG. 8C, each set of column buses and row buses can carry N+1 bits. It is understood that in some examples each set of column buses and row buses can also carry a single data bit. Each pixel cell is also electrically connected with transistors T, such as $T_{00}$, $T_{10}$, $T_{10}$, or $T_{11}$, to control the transmission of configuration signals to the pixel cell (or block of pixel cells). Transistor S of each pixel cell can be driven by the row and column select signals to enable (or disable) the corresponding transistors T to transmit configuration signals to the pixel cell. In some examples, column control circuit 804 and row control circuit 806 can be programmed by a single write instruction (e.g., from host device 702) to write to configuration memory 850 of multiple pixel cells simultaneously. Column control circuit 804 and row control circuit 806 can then control the row buses and column buses to write to the configuration memory of the pixel cells.

In some examples, local power state control circuit 826 can also receive configuration signal directly from transistors T without storing the configuration signals in configuration memory 850. For example, as described above, local power state control circuit 826 can receive row/column power state signal 834, which can be an analog signal such as a voltage bias signal or a supply voltage, to control the power state of the pixel cell and the processing circuits and/or memory used by the pixel cell.

In addition, each pixel cell also includes transistors O, such as $O_{00}$, $O_{10}$, $O_{10}$, or $O_{11}$, to control the sharing of the output bus D among a column of pixel cells. The transistors O of each row can be controlled by a read signal (e.g., read_R0, read_R1) to enable a row-by-row read out of the pixel data, such that one row of pixel cells output pixel data through output buses D0, D1, . . . Di, followed by the next row of pixel cells.

In some examples, the circuit components of pixel cell array 718, including processing circuits and memory, counter, DAC, buffer network including buffers, etc., can be organized into a hierarchical power domain managed by hierarchical power state control circuits 838. The hierarchical power domain may include a hierarchy of multiple power domains and power sub-domains. The hierarchical power state control circuits can individually set a power state of each power domain, and each power sub-domain under each power domain. Such arrangements allow fine grain control of the power consumption by image sensor 704 and support various spatial and temporal power state control operations to further improve the power efficiency of image sensor 704.

While some of the pixel-level or block-level ADCs are disabled, high speed control signals, such as clocks, analog ramp signals, or digital ramp signals, may still be transmitted to each pixel-level or block-level ADCs via buffer network, which can consume a substantial amount of power and increase the average power consumption for generation of each pixel. The inefficiency can be further exacerbated when the sparsity of the image frame increases (e.g., containing fewer pixels), but the high-speed control signals are still transmitted to each pixel cell, such that the power consumption in transmitting the high-speed control signals remains the same and the average power consumption for generation of each pixel increases due to fewer pixels being generated.

Figure 9:
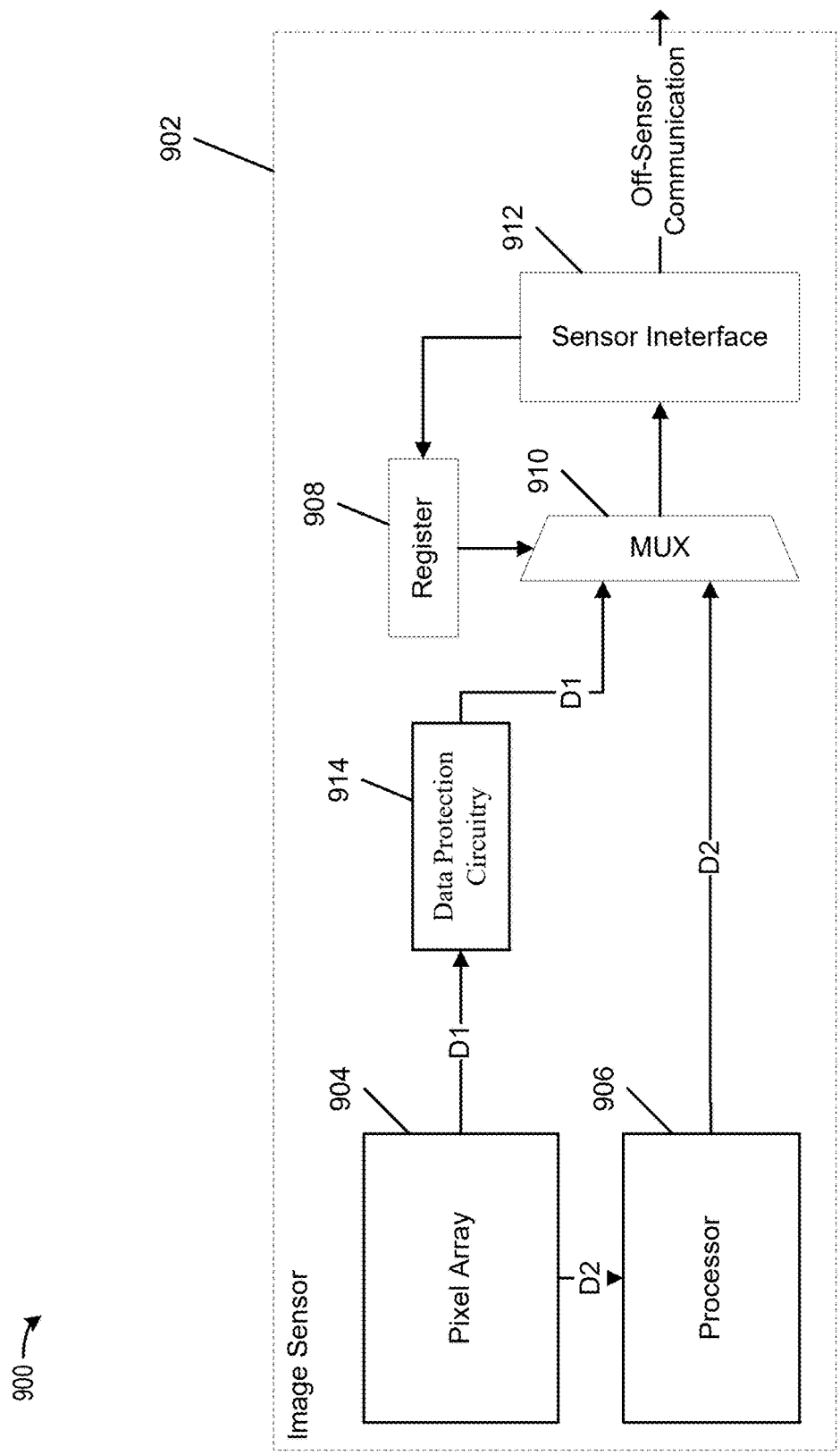
FIG. 9 illustrates an example on-sensor data guardian.

FIG. 9 illustrates an example data guardian circuit 900. Specifically, FIG. 9 depicts a circuit 900 that is part of or otherwise coupled to an image sensor 902 and provides a level of security to the data being output by the image sensor 902. In some embodiments, data guardian circuit 900 is a component of near-eye display 100 and/or one or more of the image sensors 120a-120d, 150a and 150b, 370, 600, and 704. Although the data guardian circuit 900 is discussed with respect to use with an image sensor, the data guardian circuit 900 can be used with any combination of devices in which data privacy is a concern. For example, the data guardian circuit 900 can be used for applications using outward facing sensors or inward facing sensors (e.g., biometrics) that are obtaining or sharing data that will want to be protected. The data guardian circuit 900 can be used with any combination of devices including various sensors discussed with respect to FIGS. 1A-8C. For example, the data guardian circuit 900 can be used with the near-eye display 100 discussed herein. Additionally, the elements discussed with respect to FIGS. 1A-8C can be modified with elements of the data guardian circuit 900 to provide the functionality discussed herein. For example, the data protection circuitry 914, discussed in greater detail below, can be implemented along the input and/or output buses coupled to the output module 807 discussed with respect to FIGS. 8A-8C.

The data guardian circuit 900 can provide different mechanisms designed to protect access to sensitive data being transmitted within a device, sensor, circuit, etc. in various embodiments. Sensitive data can include any combination of data that may include collected and/or captured data that has not been encrypted, obfuscated for privacy, etc. Such data may include the raw image data captured and transmitted by the image sensor 902. Although the present disclosure discusses the protection of image data, any combination of data captures by sensors and/or input devices can be used without departing from the scope of the present disclosure. For example, it could be desirable to protect biometric data, location data, personal identifying information, configuration data, browsing data, etc. In some embodiments, the data guardian circuit 900 can be designed as part of the image sensor 902 itself, as depicted in FIG. 9, or it can be a separate circuit coupled to the image sensor 902 or includes the image sensor 902 thereon. The image sensor 902 can include any combination of features and functionality as discussed with respect to the image sensors 120a-120d, 150a, 150b, 370, 600, and 704 discussed herein.

In FIG. 9, the data guardian circuit 900 includes a pixel array 904, which may be a pixel array 904 including an array of pixel cells. The pixel cells of pixel array 904 may each include one or more photodiodes configured to generate a charge in response to receiving light 902 as input. When the charge is generated, a charge storage device may convert the charge to output as raw image data. Raw image data may be output as unprocessed data that contains full resolution data read out from each of the pixels in the pixel array 904. The pixel cells and pixel array 904 can include any combination of pixels and pixel arrays, for example, pixel cells 402 pixel cells 601, and pixel cell array 718 discussed herein. FIG. 9 depicts an image sensor 902 having a pixel array 904, however, the circuit 900 can be designed to work with any number of image sensors 902. In some embodiments, the pixel array 904 can output raw image data over multiple separate and distinct data paths. For example, as shown in FIG. 9, the pixel array 904 outputs raw image data over a first data path D1 and over a second data path D2. The first data path D1 continues unmodified through to a switching mechanism (e.g., MUX 910) while the second data path D2 includes an intermediary device (e.g., processor 906) that modifies the raw image data prior to the data continuing to a switching mechanism.

In some embodiments, the data guardian circuit 900 includes data protection circuitry 914 configured to physically restrict access to the raw image data captured and output by the pixel array 904. The data protection circuitry 914 can include any combination of electrical components that physically enables or disables the passage of data over a data path. In some embodiments, activation of the data protection circuitry 914 is a one-time, irreversible operation that physically destroys the continuity and/or transmission over the D1 path. The data protection circuitry 914 can include a polysilicon fuse, a one-time programmable (OTP) fuse, a via fuse (e.g., providing transmission between printed circuit board layers), PROM, high-voltage transistors, through-holes, etc. that permanently disables the data path when activated, blown, destroyed, etc. For example, the data protection circuitry 914 is a fuse that destroys its communication path upon application of a threshold voltage, threshold current, and/or write commands. Destruction of the fuse will prevent raw image data from being able to be transmitted from the pixel array 904 over the D1 path, which permanently secures access to the raw image data.

Prior to the data protection circuitry 914 being activated, there are two operational data paths (D1, D2) through which the image data can be transmitted within the data guardian circuit 900. While the D1 path is active, a user or system can bypass the D2 pathway, which only outputs protected processed image data, to access the raw image data via D1. However, once the D1 data path is disabled (e.g., via a blown fuse), only the protected processed image data provided via the data path D2 is accessible. In some embodiments, the data protection circuitry 914 is situated in series between the pixel array 904 and a switching mechanism (MUX 910) such that data transmitted over the D1 path must travel through the data protection circuitry 914 before reaching and output. The data protection circuitry 914 is designed to prevent tampering with the circuit to obviate the destruction of the D1 data path.

In some embodiments, the data path D1 includes more than one data lines such that the data protection circuitry 914 will be designed such that each of the plurality of data lines for D1 must travel through the data protection circuitry 914. For example, if the data path is designed as an 8-bit word pathway with 8-bit lines, then the data protection circuitry 914 would include 8 fuses, each positioned along one of the 8 data paths. In some embodiments, the data protection circuitry 914 include or can be combined with other circuitry or logic. For example, the data protection circuitry 914 can include a logical fuse used in conjunction with an AND gate or data Flip-Flop as part of logical operation. By destroying or otherwise blowing a fuse, or similar functionality like writing a zero to permanent memory, it will also deactivate the AND gate, effectively disabling transmission of the pathway (e.g., D2). An example of an AND gate with a fuse coupled to one of its inputs would operate normally before the fuse is blown, while the input value of fuse is a logical 1 and so the output value would be equal to the data value at the other input. Therefore, for example, if Data=0, 0 AND 1=0 and if Data=1, 1 AND 1=1. However, if the fuse is blown (or write 0 to a write-once memory), then if Data=0, 0 AND 0=0 and if Data=1, 1 AND 0=0. As such, when the fuse is blown, the AND gate would be locked at a 0 output, regardless of the other input value. AND gates with data paths greater than one can include similar functionality, for example, a data path width (8-bit, 16-bit, etc.) could have 8, 16, 32, etc. fuses situated one each on the data paths.

The data protection circuitry 914 can be configured to be activated manually and/or automatically. For a manual process, a user can connect the data protection circuitry 914 to a power supply, voltage source, current source, etc. and apply a predetermined voltage and/or current through the data protection circuitry 914 to destroy at least one element over the D1 path, for example, destroying a wire within a fuse connected in series on the D1 path. For an automatic process, the system can trigger a power, voltage, current, etc. to be applied to the data protection circuitry 914, similarly as discussed with respect to the manual process, in response to an instruction to deactivate the data path D1 or based on some predetermined criteria (e.g., tampering detection). The automatic process can also include changing a programmable logic state at input of an AND Gate or Flip-Flop and/or writing to a one-time programmable memory.

The type of process used to activate the data protection circuitry 914 can vary depending on the type of elements included within the data protection circuitry 914. In some embodiments, high-voltage transistors may be used as high-voltage switches to prevent damage to on-sensor devices. In some embodiments, polyfuse (PROM) can be used and the activation can include applying high currents and not necessarily high voltage. For example, a high current pulse can be used to change the electrical properties of a material through mechanisms like electro migration and thermal stress. However, peak currents on the order of 10 mA can be sufficient to program a PROM. Sensors can easily consume tens to hundreds of mA during normal operation so the system can support such peak currents. In some embodiments, write voltage for OTP memory can be used and activation of such can vary based on technology and node. For example, in some cases, OTP can be written using standard supply voltages for sensor (e.g., 1.8V, 3.3V).

The source of the power, voltage, current, etc. can be provided through any combination of on sensor supplies or off sensor supplies. For example, if needed, high voltage (HV) can either be generated on-chip (e.g., a charge pump circuit) or it can be generated off-chip and provided through a high-voltage pad.

In some embodiments, the data guardian circuit 900 and/or the data protection circuitry 914 can be designed as a single chip single wafer configuration, such that any modification to the data guardian circuit 900 and/or the data protection circuitry 914 would cause the entire circuit to stop working, e.g., no longer outputting any data. The single chip/single wafer design can include the data guardian circuit 900 itself, the data protection circuitry 914, or the image sensor 902 (or other sensor implementing the data protection circuitry 914). In another example, the data protection circuitry 914 can be designed with a power strap situated over the data protection circuitry 914 such that to access to replace the data protection circuitry 914 (e.g., a fuse) would also require that the user to cut the power strap, thus disabling power to the data protection circuitry 914. In another example, the data guardian circuit 900 and/or the data protection circuitry 914 can include sensors or other components to detect improper modification of the device, the data guardian circuit 900, the image sensor 902, and/or the data protection circuitry 914. Upon detection of improper modification, a signal can be triggered to disable the data protection circuitry 914 in its entirety (e.g., destroying fuse). Any combination of methods can be implemented to prevent tampering to the data protection circuitry 914 and/or disabling a subset or an entirety of the data protection circuitry 914 upon modification or detection of modification to elements of the data protection circuitry 914.

In some embodiments, the data guardian circuit 900 includes a processor 906 for processing raw image data received from the pixel array 904. The processor 906 may be a processor or processing system built into the data guardian circuit 900 (or as part of the data protection circuitry 914), including a processor and a plurality of computer-readable instructions stored in memory, such that when the processor executes the computer-readable instructions, the processor 906 is configured to perform the processes and methods described herein. The processor 906 is situated in series on the D2 data path such that it receives a raw image data input from the pixel array 904, processes the raw image data, and outputs the processed image data over D2. In some embodiments, the processor 906 can be employed as a privacy-preserving mechanism for the raw data produced by the image sensors 904. The raw image data from the image sensors 904 can be preserved/protected through a combination of image processing methods. For example, the processor 906 can use image processing to obfuscate sensitive or private image data through a combination of encryption, feature extraction (e.g., scale-invariant feature transform (SIFT) features, hidden layers or latent space in machine learning (ML) workloads), information extraction (e.g., object detection/tracking/classification), and image filtering (e.g., sparse sensing). Any combination of methods can be used to encrypt and protect the data. Once the image data is processed for privacy, it can be transmitted freely over the D2 path.

In some embodiments, the data guardian circuit 900 includes a switch-controlled bypass mechanism for selecting a data output (e.g., from either D1 or D2 data paths) and writing the data into a data register 908 (or other data store) on the circuit 900. The switch-controlled bypass mechanism for selecting the data output can include any combination of mechanisms. For example, raw image data may only be transmitted via C-PHY/D-PHY because high speed interface is needed. Processed data in D2 may be transmitted over I3C if lower bandwidth is acceptable for the system. In this case D1 and D2 travel through completely different data paths and sensor interfaces. Alternatively, the data guardian circuit 900 could accommodate multiple interfaces (e.g., C-PHY/D-PHY), one for data path D1 and one for D2.

In some embodiments, the switch-controlled bypass mechanism, as depicted in FIG. 9, is a multiplexor (MUX) 910. The MUX 910 selects between two or more data paths and forwards the selected input to a single output line. For example, the MUX 910 is a 2×1 selects between data path D1 and data path D1, as depicted in FIG. 9, and outputs through a single output line. Although a 2×1 multiplexor is depicted in FIG. 9, any size multiplexor could be used without departing from the scope of the present disclosure. For example, it can be 4×1, 8×1, 16×1, etc. multiplexor. Similarly, the multiplexor can include any number of outputs, for example, a 4×2 multiplexor. Additionally, any combination of switching methods can be used in place of the MUX 910. The switch-controlled bypass mechanism can output selected data to one or more locations. For example, the single output from the MUX 910 can be written to another component, which can process and/or output the data out from the data guardian circuit 900, and/or write data back to the memory for storage (e.g., register 908).

In some embodiments, the data guardian circuit 900 includes a sensor interface 912 or other input/output interface (e.g., interface 540). The sensor interface 912 can receive data generated by the image sensor 902/pixel array 904 from the MUX 910 and process the data for use by other components. For example, the sensor interface 912 can process the data in a suitable format to provide an output signal that is easy for a host system to transmit or display. When processing data for transmission, the sensor interface 912 can apply any combination of standards to the data. For example, the sensor interface 912 can format the data for C-PHY, I3C, etc. to enable communication between components and/or devices. In some embodiments, the sensor interface 912 follows communication protocols of whatever communication channel is used. For example, data through C-PHY must follow appropriate CSI protocol, whereas data through I3C must follow appropriate I3C protocol. Custom interfaces will have their own (either standardized or proprietary) protocols. Thereafter, the sensor interface 912 can transmit the data output through any combination of wired and wireless communication mediums. The sensor interface 912 can also output the data received from the selected line (D1 or D2) to other locations within the data guardian circuit 900 for storage and/or additional processing. In some embodiments, the logic that converts raw data streams from the processor 906 or the pixel array 904 into packets for interfaces can be included in the sensor interface 912.

In some embodiments, the data guardian circuit 900 includes a data register 908. The data register 908 can receive and store data from either of the data paths D1 and D2, via the MUX 910. The data guardian circuit 900 can use the register 908 to program different settings for the data guardian circuit 900 and the components thereof, for example, the image sensor 902 or pixel array 904. Critical settings for operation of the data guardian circuit 900 can be stored within the register 908. For example, the register can store configuration bits, bios settings, voltage values, analog-to-digital converter (ADC) resolution, frame rate, exposure time, etc. for operation of the image sensor (or any other type of sensor). The data register 908 can also control which data from the data paths D1 and D2 are being output by the MUX 910. For example, based on the information in the register 908, it can provide a selection input into the MUX 910 to dictate which data is being output by the MUX 910 at a given point in time. Using the register as a selection input can provide a toggle which of the set of input lines that are connected to the output lines of the MUX 910 to select between the data paths. This effectively preserves the image data at different points in time and/or for different operations.

The selection provided by the MUX 910 is controlled by the register 908 because it may be desirable to output both the unprocessed raw image data provided over data path D1 and the processed protected image data provided over data path D2, depending on the operation of the device. For example, it may be desirable to output raw image data during initial calibration/configuration of the device (e.g., the near-eye display 100). However, in other applications (e.g., always-on sensing, "private" mode) it may be undesirable to transmit raw image data. For example, it may be undesirable to output raw image data when being used by the end user, it may be desirable to only output protected processed data.

As such, it may be desirable for the circuit 900 to be designed to operate in both a traditional mode using raw image data readouts and a private mode leveraging privacy preserved data from the processor throughout the life cycle of the device. However, systems including switch-controlled mechanisms, such as the register 908, MUX 910, sensor interface 912 combination discussed herein can be exploited by malicious users if they have access to sensor datasheets and drivers/firmware. For example, when using particular communication methods, the user may have to expose the I3C, C-PHY, etc. standards to use the system. More specifically, the switch control mechanism can be exploited by malicious users if they have access to sensor datasheets and drivers/firmware. For example, if a user obtains access to the register 908, MUX 910, and/or sensor interface 912, the user could expose control mechanisms (i.e., registers to program settings), including for example, bios settings, on chip bias registers, analog-to-digital resolution, frame rate, exposure time, etc. through a hack or malicious attack in an attempt to steal sensitive data (e.g., image data). Once a malicious user has access to these settings and information, then the raw image data (and other data) could be forced to be output outside of a controlled environment (e.g., in a factory setting). Therefore, more secure methods for use in switch control mechanisms used in combination with sensor programming are desirable.

Figure 10:
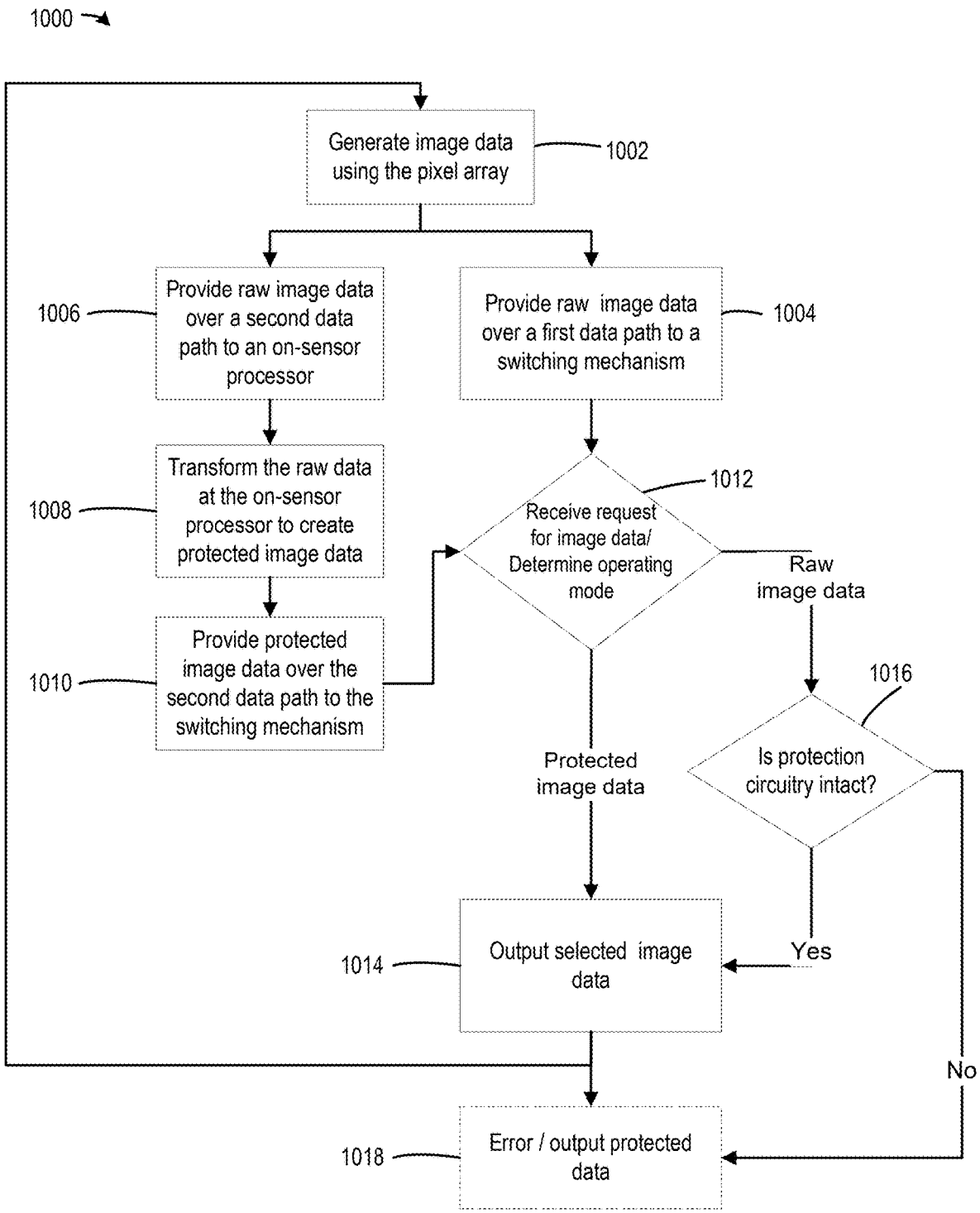
FIG. 10 is a flow diagram illustrating operation of the on-sensor data guardian.

FIG. 10 illustrates an example process for protecting raw data from being accessed. Specifically, FIG. 10 depicts a flowchart for operating a data guardian circuit according to the embodiments described herein. Process 1000 may begin at block 1002 by generating raw image data including image data to create digital pixel values. In some embodiments, generating the raw image data includes utilizing one or more photodiodes configured to generate a charge in response to light that can be stored by a charge storage device as an array of voltages. The array of voltages may be input to an ADC to generate the digital pixel values corresponding to the captured image frame.

At block 1004, the process 1000 provides the raw image data from block 1002, over a first data path D1. The first data path D1 extends between the pixel array 940 and a switching mechanism, specifically, the MUX 910. As discussed with respect to FIG. 9, there is a data protection circuitry 914 situated along the first data path D1 in series between the pixel array 940 and the MUX 910. In some embodiments, the data protection circuitry 914 does not modify the raw image data, it merely provides part of the communication pathway between the pixel array 940 and the MUX 910. Therefore, the data provided by the pixel array 940 to the MUX 910, over data path D1, is raw image data. The data path D1 can be provided on a single printed circuit board, wafer, sensor, etc. and creates a continuous pathway from the pixel array 940 to the MUX 910 with the data protection circuitry 914 situated therebetween.

In some embodiments, data can be written into OTP for simple encryption (e.g., Simple XOR substitution cipher) by adding extra bits to OTP, such that encryption bits" can be included in data path D1 while still including a data path select bit to select D1 or D2. In this case, the data protection circuitry 914 could transmit either raw pixel data in D1 or encrypted data in D1. Similarly, the data protection circuitry 914 could transmit processed data in D2 or an encrypted version of the processed data in D2.

At block 1006, the process 1000 provides the raw image data from block 1002, over a second data path D2. The second data path D2 extends between the pixel array 940 and the switching mechanism, specifically, the MUX 910. As discussed with respect to FIG. 9, there is an on-sensor processor 906 situated along the second data path D2 in series between the pixel array 940 and the MUX 910. The data path D2 can be provided on a single printed circuit board, wafer, sensor, etc. and creates a continuous pathway from the pixel array 940 to the MUX 910 with the on-sensor process 906 situated therebetween.

At block 1008, the on-sensor processor 906 modifies the raw image data and then outputs the processed image data over the D2 communication pathway to the MUX 910. Therefore, the data provided by the pixel array 940 to the MUX 910, over data path D2, is processed image data. The processed image data can include any modification to the raw image data that provides privacy to and/or protects the original content of the raw image data. As discussed herein, the on-sensor processor 906 can be configured to modify the raw image data to protect the information included within the data. The modification can be provided through image processing that obfuscates sensitive or private image data through encryption, extracts feature from the raw image data, extracts information from the raw image data, filters the raw image data, or a combination thereof. The feature extraction can include at least one of scale-invariant feature transformation (SIFT), hidden layers, and latent space in machine learning workloads, the information extraction can include at least one of object detection, tracking, and classification, and the image filtering can include sparse sensing.

At block 1010, once the image data is processed, the protected/privacy preserved image data is transmitted along the second data path D2 to the MUX 910.

At block 1012, a request for image data is received. The request for image data can be received through the sensor interface 912 and can be provided to the register 908 to determine whether to output raw image data over data path D1 or processed protected image data over data path D2. Depending on the selected data type and/or the operating mode (e.g., traditional vs private operating modes), the MUX 910 will select which data path input D1 or D2 to output.

An example of when raw image data would be selected/desirable is during factory testing/calibration or with certain operating modes (e.g., low-power point-of-view capture). These operations may require transmission of raw image data and the sensor or device may not be able to support the power requirements of running the on-sensor processor 906 to format the data for privacy, encryption, etc. An example of when processed image data may include when the device is being operated by a user in a commercial setting, for example an end user using the device for entertainment, health/fitness, work, etc. If the operating mode is the private operating mode, then the processed image data is output and the process 1000 advances to block 1014 and if the operating mode is the traditional operating mode, then the raw image data is output and the process 1000 advances to block 1016.

At block 1014, the data can be output by the MUX 910 to the sensor interface 912 for delivery to other components within a device or other devices remote to the device. For example, data can be output by the sensor interface 912 to other devices in communication with the near-eye display 100, such as a computer, other near-eye displays, etc. over the Internet. The output of the MUX 910 can include a selection of either the raw image data, as captured by the pixel array 904 or the processed version of the raw image data that is formatted by the processor 906 for encryption and/or privacy purposes. The raw image data is received at a first input on the MUX 910 from the first data path D1 and processed image data is received at a second input on the MUX 910 from the second data path D2. Therefore, the MUX 910 receives two different versions of the image data from two different sources at the two different inputs.

At block 1016, a check or detection for whether the protection circuitry 914 is intact is performed. The including of the protection circuitry 914 provides a hardware failsafe that can be built into the sensor 902 to prevent access that exploits the software controls for the sensor. If the protection circuitry 914 is intact, then the process 1000 advances to step 1014 and the raw image data is able to be input to the MUX 910 and selected (e.g., by the register 908) for output. If the protection circuitry 914 is not intact, then the process 1000 advances to step 1018 and the raw image data is not able to be input to the MUX 910 and thus cannot be output. For example, if the protection circuitry 914 includes a fuse, while the fuse is intact, the raw data provided over D1 can be read into the MUX 910 and subsequently output if desired, however, if the fuse is blown then the connection to D1 is destroyed and the raw image data cannot be accessed. In some embodiments, once destroyed, the hardware failsafe provided by the protection circuitry 914 is a permanent change that cannot reversed, changed, overridden, etc. As such, once the protection circuitry 914 is destroyed or otherwise disabled, the raw image data can no longer by output by the MUX 910 or any downstream hardware. This could result in the MUX 910 operating normally but only having the protected data available form the inputs or the protection circuitry 914 permanently flips the switch in the MUX 910 to force it to only output the protected data.

At block 1018, optionally, an error is triggered when an attempt is made to output raw image data and the protection circuitry 914 is no longer intact. The error can cause the protection circuitry 914 to operating in any number of ways depending in the configuration. For example, 1 the software can recognize the blown fuse and provide an explanation, the software will time out, nothing will happen, it could intentionally output garbled data or all 0s or 1s in response to the error, etc.

Depending on the communication standard used by the sensor interface 912 or other downstream hardware can be exposed to malicious attacks and/or hacking. Exposed control systems, such as the register 908, can be written by software make it is possible to open system to vulnerability to be programmed to operate the image sensor 902 in an unintended fashion. Malicious user could gain control of sensor interface 912 and/or the register 908 and modify settings within register, for example, change setting so that register will output only raw data. Therefore, it is desirable to provide a hardware solution that prevents access to the register 908 to avoid malicious attacks.

Figure 11:
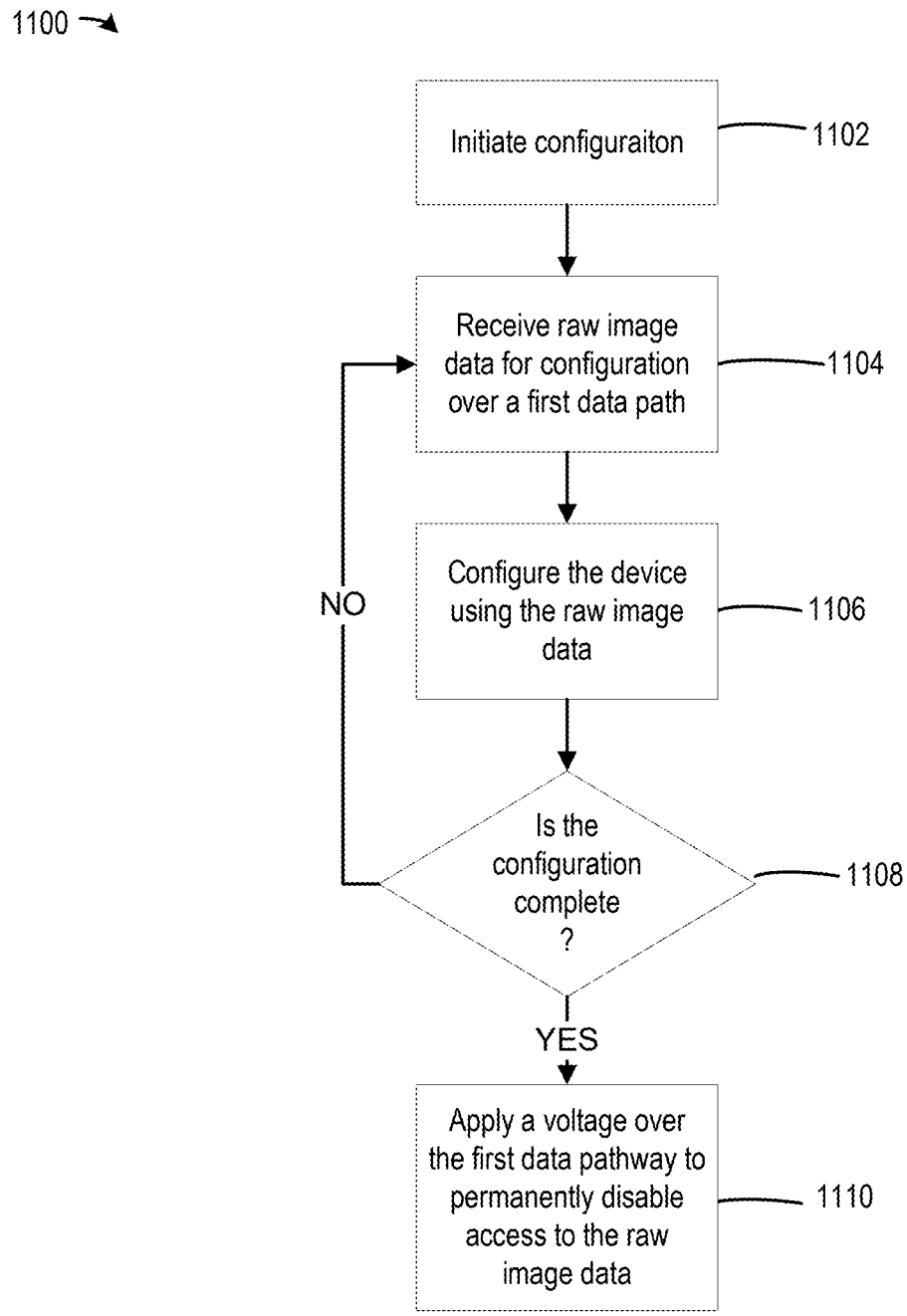
FIG. 11 is a flow diagram illustrating operation of the on-sensor data guardian.

FIG. 11 illustrates an example process for protecting raw data from being accessed. Specifically, FIG. 11 depicts a flowchart for implementing a data guardian circuit 900 according to the embodiments described herein. Process 1100 may begin at block 1102 by initiating a traditional operating mode for a device (e.g., near-eye display 100) having one or more image sensors 120a-120d, 150a and 150b, 370, 600, and 704. When operating in the traditional operating mode, the raw image data from the image sensors can be output from the device, for example, via the MUX 910.

At block 1104, the process 1100 accesses the raw data provided over a first output data path D1 to a MUX 910, for example, from an array of pixel cells. A register 908 coupled to an input of the MUX 910 can then select the raw image data for output from the MUX 910 to a sensor interface 912. Thereafter, the sensor interface 912 can output the raw image data to other hardware elements within the device or output the raw image data from the device itself. The raw image data is unmodified such that the raw image data may include unfiltered private/personal data about a user and/or the user's surroundings. In some embodiments, the raw image data can be used for configuration of the device. For example, the raw image data can be used for die sorting, calibrating sensor, ISP configuration, factory calibration, etc.

At block 1106, the raw image data is used to calibrate/configure the device. For example, the device is connected to a configuration device or programming rig, directly or wirelessly, and the raw image data is output to a connected device, remote console, or rig for calibration/configuration of the device (e.g., to check the output image for a test image to see if it matches what is expected, whether there are dead pixels in the sensor, whether a color filter or lens has failed, etc.). In some embodiments, the device calibration/configuration is a one-time configuration, generally performed in a manufacturing facility or during an initial setup by an end user. The one-time calibration/configuration can be used to configure the image sensors and other hardware on the device for use by the end user.

At block 1108, a determination is made whether the calibration/configuration is complete. If the calibration/configuration is not complete, then the process 1100 returns to block 1104 and continues to receive and use the raw image data until the calibration/configuration is complete. For example, the calibration/configuration may continue until the necessary raw image data is received to program the device for operation. If the calibration/configuration is complete, then the process 1100 advances to block 1110 and the configuration is finalized. Once completed, the calibration/configuration process can be finalized.

At block 1110, the one-time protection circuitry 914, connected in series with the first output data path D1, is activated/destroyed. The activation of the one-time protection circuitry 914 disables access to the raw data provided over the first output data path. Specifically, the protection circuitry 914 destroys the continuous communication pathway previously provided over D1. For example, the protection circuitry 914 can be a fuse that has an internal wire that is destroyed, thus interrupting the data pathway D1 between the pixel array 904 and the MUX 910. Thereafter, the MUX 910 no longer receives the raw data input thus cannot output the raw image data. Nor can the raw image data be accessed through the MUX 910 or other downstream hardware that may become compromised in the future. Therefore, only the processed image data provided by the processor 906 over data path D2 will be accessible in the future.

The data path can be interrupted by the protection circuitry 914 using any combination of methods discussed herein. For example, the protection circuitry 914 can or can include a fuse that is destroyed, it can include a logic input into one or more AND Gates or Flip-Flops, or it can include any other type of logic or wire destruction method known in the art. Similarly, activation and/or destruction of the protection circuitry 914 can be performed using any combination of methods known in the art. For example, an attached computing system or rigs can apply a high voltage to blow the fuse or otherwise break a physical communication line in the protection circuitry 914. Alternatively, a one-time programmable memory can be written to that turns off the communication pathway or an application can be used to trigger an on device high voltage generator to destroy fuse.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, blocks, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, blocks or processes described.

Embodiments of the disclosure may also relate to an apparatus for performing the operations described. The apparatus may be specially constructed for the required purposes, and/or it may include a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer-readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A privacy control circuit comprising:
   an array of pixel cells having a first output data path and a second output data path, the first output data path including a one-time data protection circuitry;
   a sensor communication interface communicatively coupled to the first output data path;
   an on-sensor processor coupled to the second output data path and communicatively attached to the sensor communication interface; and
   a data register communicatively attached to the sensor communication interface.

2. The circuit of claim 1, further comprising a multiplexer configured for selecting between a raw data input signal over the first output data path and a privacy preserving input signal over the second output data path.

3. The circuit of claim 1, wherein the on-sensor processor is configured to obfuscate sensitive image data through encryption, feature extraction, information extraction, image filtering, or a combination thereof.

4. The circuit of claim 3, wherein the feature extraction includes at least one of scale-invariant feature transformation (SIFT), hidden layers, and latent space in machine learning workloads.

5. The circuit of claim 3, wherein the information extraction includes at least one of object detection, tracking, and classification.

6. The circuit of claim 3, wherein the image filtering includes sparse sensing.

7. The circuit of claim 1, wherein the one-time data protection circuitry includes one of a polysilicon fuse, a one-time programmable fuse, a via fuse, high voltage transistors, and polyfuse.

8. The circuit of claim 1, wherein the first output data path includes a plurality of data paths.

9. The circuit of claim 8, wherein the one-time data protection circuitry includes a plurality of fuses, each of the fuses coupled to a respective one of the plurality of data paths.

10. The circuit of claim 1, wherein the one-time data protection circuitry is coupled in series with the first output data path.

11. The circuit of claim 1, wherein the one-time data protection circuitry is coupled to an input of one or more logic gates or flops.

12. The circuit of claim 1, wherein the activation of the one-time data protection circuitry disables dataflow over the first output data path while dataflow over the second output data path is uninterrupted, preventing access to unprotected raw image data.

13. The circuit of claim 1, wherein the sensor communication interface writes to the data register.

14. The circuit of claim 1, wherein the first output data path is configured to transmit raw image data.

15. The circuit of claim 1, wherein the second output data path is configured to transmit processed image data.

16. The circuit of claim 1, wherein data transmission over the one-time data protection circuitry is destroyed in response to an application of a voltage great than to disable communication over the first output data path.

17. A method for protecting raw data from being accessed, the method comprising:
- initiating a traditional operating mode for configuring a device;
- accessing raw data from an array of pixel cells provided over a first output data path;
- completing configuration of the device; and
- activating a one-time data protection circuitry connected in series with the first output data path, the activation of the one-time data protection circuitry disabling access to the raw data provided over the first output data path.

18. The method of claim 17, wherein the one-time data protection circuitry includes one of a polysilicon fuse, a one-time programmable fuse, a via fuse, high voltage transistors, and polyfuse.

19. The method of claim 17, further comprising a second output data path including processed image data from the array of pixel cells.

20. An artificial reality system, comprising:
- an array of pixel cells having a first output data path and a second output data path, the first output data path including a one-time data protection circuitry;
- a sensor communication interface communicatively attached to the first output data path;
- an on-sensor compute coupled to the second output data path and communicatively attached to the sensor communication interface;
- a data register communicatively attached to the sensor communication interface; and
- a display for outputting an artificial reality content.

* * * * *